United States Patent
Ly et al.

(10) Patent No.: US 10,602,515 B2
(45) Date of Patent: Mar. 24, 2020

(54) GUARD BAND WITH SYNCHRONIZATION INFORMATION

(71) Applicant: QUALCOMM Incorporated, San Diego, CA (US)

(72) Inventors: Hung Ly, San Diego, CA (US); Jing Jiang, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 245 days.

(21) Appl. No.: 15/644,663

(22) Filed: Jul. 7, 2017

(65) Prior Publication Data

US 2018/0077710 A1    Mar. 15, 2018

Related U.S. Application Data

(60) Provisional application No. 62/393,582, filed on Sep. 12, 2016.

(51) Int. Cl.
*H04W 72/04* (2009.01)
*H04L 5/00* (2006.01)
(Continued)

(52) U.S. Cl.
CPC ....... *H04W 72/0453* (2013.01); *H04L 5/0053* (2013.01); *H04L 5/0064* (2013.01);
(Continued)

(58) Field of Classification Search
CPC . H04L 27/2602; H04L 5/0053; H04L 5/0064; H04W 56/001; H04W 72/0453; H04W 84/042; H04W 72/0406
See application file for complete search history.

(56) References Cited

U.S. PATENT DOCUMENTS

2015/0163680 A1* 6/2015 Valliappan ............ H04W 16/14
                                                                370/329
2018/0206253 A1* 7/2018 Yun ....................... H04L 5/0062
(Continued)

FOREIGN PATENT DOCUMENTS

WO    WO-2017171885 A1 * 10/2017    .......... H04W 72/082

OTHER PUBLICATIONS

Convida Wireless: "Discussion on Sync Signals Supporting Different Numerologies", 3GPP Draft; R1-167847, 3rd Generation Partnership Project (3GPP), Mobile Competence Centre, 650, Route Des Lucioles, F-06921, Sophia-Antipolis Cedex, France, vol. RAN WG1, No. Gothenburg, Sweden; Aug. 21, 2016, XP051140829, Retrieved from the Internet: URL:http://www.3gpp.org/ftp/Meetings_3GPP_SYNC/RAN1/Docs/ [retrieved on Aug. 21, 2016], 4 pages.
(Continued)

*Primary Examiner* — Un C Cho
*Assistant Examiner* — Shah M Rahman
(74) *Attorney, Agent, or Firm* — Loza & Loza, LLP/Qualcomm

(57) ABSTRACT

Various aspects of the disclosure relate to scaled numerology for orthogonal frequency division multiplexing (OFDM) waveforms or other forms of communication. First information can be encoded into a first numerology at a first set of tones and first synchronization information can be encoded into a second numerology at second set of tones. In addition, second synchronization information can be encoded into a guard band in such a way that this information can be interpreted under either the first numerology or the second numerology.

29 Claims, 22 Drawing Sheets

(51) Int. Cl.
  H04L 27/26 (2006.01)
  H04W 56/00 (2009.01)
  H04W 84/04 (2009.01)
(52) U.S. Cl.
  CPC ....... H04L 27/2602 (2013.01); H04W 56/001 (2013.01); H04W 72/0406 (2013.01); H04W 84/042 (2013.01)

(56) References Cited

U.S. PATENT DOCUMENTS

| | | | | |
|---|---|---|---|---|
| 2018/0241495 | A1* | 8/2018 | Xue | H04J 11/00 |
| 2018/0249433 | A1* | 8/2018 | Shin | H04L 5/0005 |
| 2018/0270008 | A1* | 9/2018 | Yi | H04J 11/0069 |
| 2018/0287844 | A1* | 10/2018 | Kim | H04L 27/2655 |
| 2018/0295007 | A1* | 10/2018 | Kumar | H04J 13/00 |
| 2018/0302254 | A1* | 10/2018 | Yamada | H04L 5/0053 |
| 2019/0013985 | A1* | 1/2019 | Takeda | H04W 56/0015 |
| 2019/0028221 | A1* | 1/2019 | Ratasuk | H04J 11/0069 |
| 2019/0028243 | A1* | 1/2019 | Kim | H04J 11/00 |
| 2019/0044690 | A1* | 2/2019 | Yi | H04L 5/14 |
| 2019/0103931 | A1* | 4/2019 | Yi | H04W 56/00 |

OTHER PUBLICATIONS

International Search Report and Written Opinion—PCT/US2017/049769—ISA/EPO—dated Nov. 24, 2017.

Mediatek Inc: "Discussion on Downlink NB-IOT Solutions", 3GPP Draft; R1-155896, 3rd Generation Partnership Project (3GPP), Mobile Competence Centre, 650, Route Des Lucioles, F-06921, Sophia-Antipolis Cedex, France, vol. RAN WG1, No. Malmo, Sweden; Oct. 4, 2015, XP051939773, Retrieved from the Internet: URL:http://www.3gpp.org/ftp/Meetings_3GPP_SYNC/RAN1/Docs/ [retrieved on Oct. 4, 2015], 4 pages.

Sharp: "Synchronization Signal Design for NN-IoT", 3GPP TSG RAN WG1 Meeting #83, R1-157119, Nov. 15, 2015, XP051040013, Retrieved from the Internet: URL:http://www.3gpp.org/ftp/Meetings_3GPP_SYNC/RAN1/Docs/, 4 pages.

Sony: "Synchronisation Signal Design Principles for NB-IoT", 3GPP DRAFT; R1-155879, 3rd Generation Partnership Project (3GPP), Mobile Competence Centre, 650, Route Des Lucioles, F-06921, Sophia-Antipolis Cedex, France, vol. RAN WG1, No. Malmo, Sweden; Sep. 30, 2015, XP051021913, Retrieved from the Internet: URL:http://www.3gpp.org/ftp/tsg_ran/WG1_RL1/TSGR1_82b/Docs/ [retrieved on Sep. 30, 2015], 2 pages.

Wi Rapporteur (Ericsson): "RAN1 agreements for Rel-13 NB-IoT",3GPP Draft; R1-165977, 3rd Generation Partnership Project (3GPP), Mobile Competence Centre, 650, Route Des Lucioles, F-06921, Sophia-Antipolis Cedex, France, vol. RAN WG1, No. Nanjing, China; Aug. 11, 2016, XP051141850, Retrieved from the Internet: URL:http://www.3gpp.org/ftp/tsg_ran/WG1_RL1/TSGR1_85/Docs/ [retrieved on Aug. 11, 2016], 33 pages.

* cited by examiner

GUARD BAND WITH SYNCHRONIZATION INFORMATION

CROSS-REFERENCE TO RELATED APPLICATIONS

This application claims priority to and the benefit of U.S. Provisional Application Ser. No. 62/393,582, filed on Sep. 12, 2016, the entire content of which is incorporated herein by reference.

INTRODUCTION

Various aspects described herein relate to wireless communication and, more particularly but not exclusively, to a guard band that includes synchronization information.

The $5^{th}$ Generation (5G) mobile standard is currently being formulated and calls for higher data transfer speeds, greater numbers of connections, and better coverage, among other improvements. The 5G standard, according to the Next Generation Mobile Networks Alliance, is expected to provide data rates of several tens of megabits per second. Several hundreds of thousands of simultaneous connections could be supported for large sensor deployments. Consequently, the spectral efficiency of 5G mobile communication may be significantly enhanced compared to the current 4G mobile communication standard. Furthermore, signaling efficiencies may be enhanced and latency reduced compared to current standards.

In some cases, the signaling used to communicate between devices (e.g., at these higher data rates and/or lower latencies) may be subject to interference. Accordingly, there is a need for development of better transmission techniques and processing techniques for wireless communication to meet different requirements of different applications and/or different users at the same time while mitigating potential interference between the signaling used for these applications and/or users.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In some aspects, the disclosure provides a method for communication including: determining a first transmission property for communication via a first set of tones allocated for first information; determining a second transmission property for communication via a second set of tones allocated for first synchronization information; determining a third transmission property for communication via a third set of tones allocated for a guard band between the first set of tones and the second set of tones; communicating the first information via the first set of tones using the first transmission property; communicating the first synchronization information via the second set of tones using the second transmission property; and communicating second synchronization information via the third set of tones using the third transmission property.

In some aspects, the disclosure provides an apparatus configured for communication that includes a memory and a processor coupled to the memory. The processor and the memory are configured to: determine a first transmission property for communication via a first set of tones allocated for first information; determine a second transmission property for communication via a second set of tones allocated for first synchronization information; determine a third transmission property for communication via a third set of tones allocated for a guard band between the first set of tones and the second set of tones; communicate the first information via the first set of tones using the first transmission property; communicate the first synchronization information via the second set of tones using the second transmission property; and communicate second synchronization information via the third set of tones using the third transmission property.

In some aspects, the disclosure provides an apparatus configured for communication. The apparatus including: means for determining transmission properties, wherein the transmission properties include a first transmission property for communication via a first set of tones allocated for first information, a second transmission property for communication via a second set of tones allocated for first synchronization information, and a third transmission property for communication via a third set of tones allocated for a guard band between the first set of tones and the second set of tones; and means for communicating configured to communicate the first information via the first set of tones using the first transmission property, communicate the first synchronization information via the second set of tones using the second transmission property, and communicate second synchronization information via the third set of tones using the third transmission property.

In some aspects, the disclosure provides a non-transitory computer-readable medium storing computer-executable code, including code to: determine a first transmission property for communication via a first set of tones allocated for first information; determine a second transmission property for communication via a second set of tones allocated for first synchronization information; determine a third transmission property for communication via a third set of tones allocated for a guard band between the first set of tones and the second set of tones; communicate the first information via the first set of tones using the first transmission property; communicate the first synchronization information via the second set of tones using the second transmission property; and communicate second synchronization information via the third set of tones using the third transmission property.

Further to the above, the disclosure may also relate in some aspects to the features that follow. In some aspects, the second synchronization information may be communicated every Nth tone of the third set of tones; where N is greater than or equal to 2. In some aspects, the first transmission property, the second transmission property, and the third transmission property may include (e.g., may be) at least one tone spacing. In some aspects, the first transmission property may include a first tone spacing; and the second transmission property may include a second tone spacing that may be N times the first tone spacing; where N is greater than or equal to 2. In some aspects, the first transmission property may include a first tone spacing; and the second transmission property may include a second tone spacing; the first tone spacing may be N times the second tone spacing; where N is greater than or equal to 2. In some aspects, the first transmission property, the second transmission property, and the third transmission property may include at least one cyclic prefix (CP) duration. In some aspects, the first transmission property may include a first cyclic prefix (CP) duration; and the second transmission property may include a second cyclic prefix (CP) duration that may be N times the first cyclic prefix (CP) duration; where N is greater than or equal to 2. In some aspects, the first transmission property may include a first cyclic prefix (CP) duration; the second transmission property may include a second cyclic prefix (CP) duration; and the first cyclic prefix (CP) duration may be N times the second cyclic prefix (CP) duration; where N is greater than or equal to 2. In some aspects, the first transmission property may be different from the second transmission property; and the third transmission property may equal the second transmission property. In some aspects, the first information may include data, control information, or a combination thereof. In some aspects, the second synchronization information may include at least one primary synchronization signal (PSS). In some aspects, the second synchronization information may include at least one secondary synchronization signal (SSS). In some aspects, the second synchronization information may include at least one short secondary synchronization signal (SSS) sequence 1. In some aspects, the second synchronization information may include at least one short secondary synchronization signal (SSS) sequence 2. In some aspects, the second synchronization information may include physical broadcast channel (PBCH) information.

In some aspects, the method may further include determining whether the first transmission property is different from the second transmission property; and invoking the determination of the third transmission property for communication of the guard band via a third set of tones if the first transmission property is different from the second transmission property. In some aspects, the processor and the memory may be further configured to: determine whether the first transmission property is different from the second transmission property; and invoke the determination of the third transmission property for communication of the guard band via a third set of tones if the first transmission property is different from the second transmission property. In some aspects, an apparatus may further include: means for determining whether the first transmission property is different from the second transmission property; and means for invoking the determination of the third transmission property for communication of the guard band via a third set of tones if the first transmission property is different from the second transmission property. In some aspects, the non-transitory computer-readable medium may further include code to: determine whether the first transmission property is different from the second transmission property; and invoke the determination of the third transmission property for communication of the guard band via a third set of tones if the first transmission property is different from the second transmission property.

In some aspects, the communication of the first information may include sending the first information via the first set of tones; the communication of the first synchronization information may include sending the first synchronization information via the second set of tones; and the communication of the second synchronization information may include sending the second synchronization information via the third set of tones. In some aspects, the method may further include: determining whether to send at least one of physical broadcast channel information, secondary synchronization signal information, primary synchronization signal information, or any combination thereof via the third set of tones. In some aspects, the processor and the memory may be further configured to: determine whether to send at least one of physical broadcast channel information, secondary synchronization signal information, primary synchronization signal information, or any combination thereof via the third set of tones. In some aspects, an apparatus may further include: means for determining whether to send at least one of physical broadcast channel information, secondary synchronization signal information, primary synchronization signal information, or any combination thereof via the third set of tones. In some aspects, the non-transitory computer-readable medium may further include code to: determine whether to send at least one of physical broadcast channel information, secondary synchronization signal information, primary synchronization signal information, or any combination thereof via the third set of tones. In some aspects, the second synchronization information may be based on the determination of whether to send the physical broadcast channel information, the secondary synchronization signal information, the primary synchronization signal information, or any combination thereof.

In some aspects, the communication of the first information may include receiving the first information via the first set of tones; the communication of the first synchronization information may include receiving the first synchronization information via the second set of tones; and the communication of the second synchronization information may include receiving the second synchronization information via the third set of tones.

In some aspects, the method may further include: detecting physical broadcast channel information based on the second synchronization information received via the third set of tones; and determining broadcast information based on the detected physical broadcast channel information. In some aspects, the processor and the memory may be further configured to: detect physical broadcast channel information based on the second synchronization information received via the third set of tones; and determine broadcast information based on the detected physical broadcast channel information. In some aspects, an apparatus may further include: means for detecting physical broadcast channel information based on the second synchronization information received via the third set of tones; and means for determining broadcast information based on the detected physical broadcast channel information. In some aspects, the non-transitory computer-readable medium may further include code to: detect physical broadcast channel information based on the second synchronization information received via the third set of tones; and determine broadcast information based on the detected physical broadcast channel information. In some aspects, the detection of the physical broadcast channel information may be further based on the first synchronization information received via the second set of tones.

In some aspects, the method may further include: detecting secondary synchronization signal information based on the second synchronization information received via the third set of tones; and determining, based on the detected secondary synchronization signal information, at least one of: a physical cell identifier, frame timing, or a combination thereof. In some aspects, the processor and the memory may be further configured to: detect secondary synchronization signal information based on the second synchronization information received via the third set of tones; and determine, based on the detected secondary synchronization signal information, at least one of: a physical cell identifier, frame timing, or a combination thereof. In some aspects, an apparatus may further include: means for detecting secondary synchronization signal information based on the second synchronization information received via the third set of tones; and means for determining, based on the detected secondary synchronization signal information, at least one of: a physical cell identifier, frame timing, or a combination thereof. In some aspects, the non-transitory computer-readable medium may further include code to: detect secondary synchronization signal information based on the second synchronization information received via the third set of tones; and determine, based on the detected secondary synchronization signal information, at least one of: a physical cell identifier, frame timing, or a combination thereof. In some aspects, the detection of the secondary synchronization signal information may be further based on the first synchronization information received via the second set of tones.

In some aspects, the method may further include: detecting primary synchronization signal information based on the first synchronization information received via the second set of tones; and determining, based on the detected primary synchronization signal information, at least one of: timing, a coarse frequency offset estimate, or a combination thereof. In some aspects, the processor and the memory may be further configured to: detect primary synchronization signal information based on the first synchronization information received via the second set of tones; and determine, based on the detected primary synchronization signal information, at least one of: timing, a coarse frequency offset estimate, or a combination thereof. In some aspects, an apparatus may further include: means for detecting primary synchronization signal information based on the first synchronization information received via the second set of tones; and means for determining, based on the detected primary synchronization signal information, at least one of: timing, a coarse frequency offset estimate, or a combination thereof. In some aspects, the non-transitory computer-readable medium may further include code to: detect primary synchronization signal information based on the first synchronization information received via the second set of tones; and determine, based on the detected primary synchronization signal information, at least one of: timing, a coarse frequency offset estimate, or a combination thereof. In some aspects, the detection of the primary synchronization signal information may be further based on the second synchronization information received via the third set of tones.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

The accompanying drawings are presented to aid in the description of aspects of the disclosure and are provided solely for illustration of the aspects and not limitations thereof.

DETAILED DESCRIPTION

Figure 1:
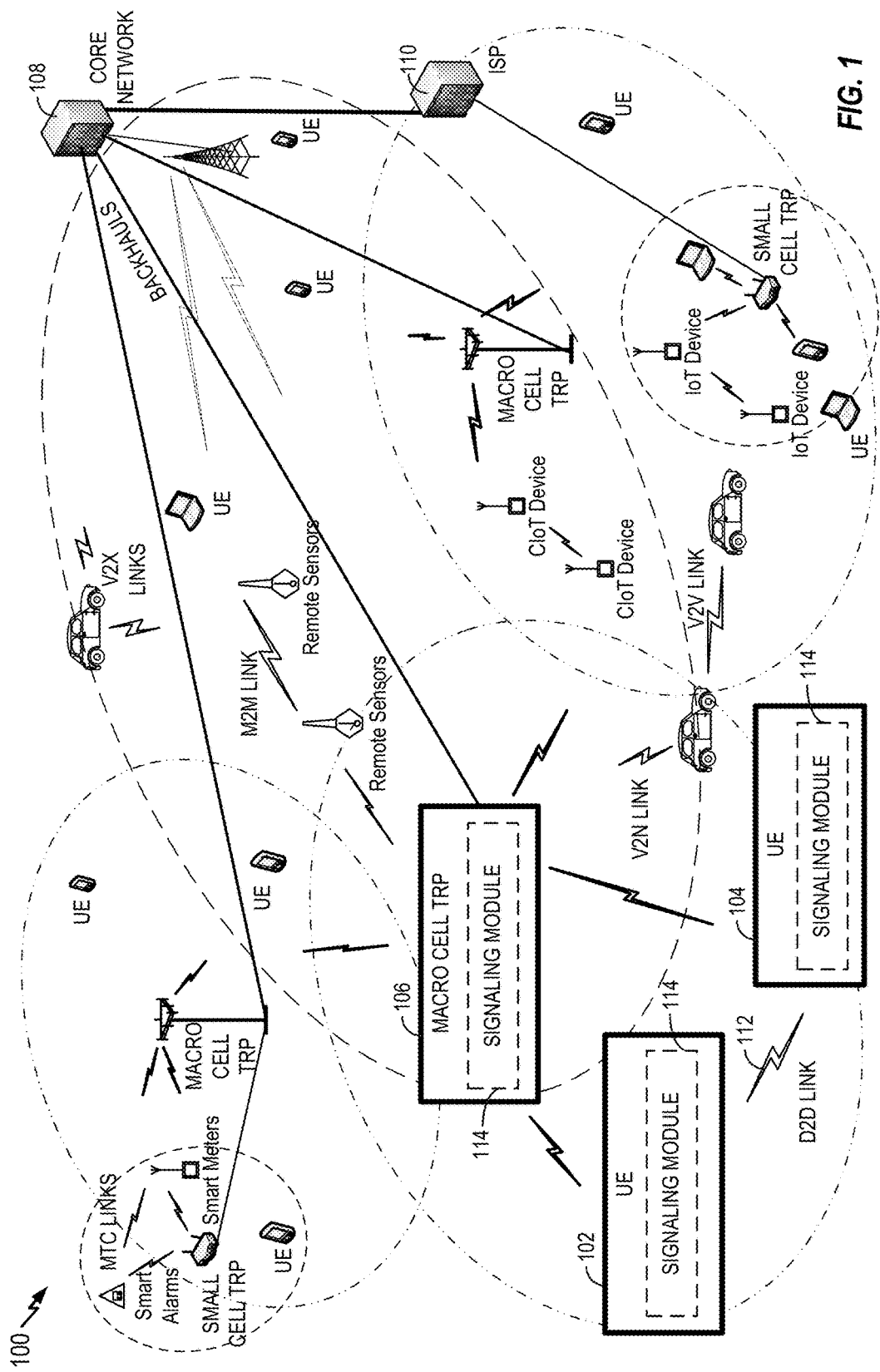
FIG. 1 is a diagram of an example communication system in which aspects of the disclosure may be used.

Various aspects of the disclosure relate to scaled numerology for orthogonal frequency division multiplexing (OFDM) waveforms or other forms of communication. This numerology may include, for example, a cyclic prefix duration or a tone spacing (e.g., a sub-carrier spacing). First information can be encoded into a first numerology at a first set of tones (e.g., sub-carriers) and synchronization information can be encoded into a second numerology at second set of tones. The first numerology may be a factor of the second numerology by N or 1/N. For example, the cyclic prefix (CP) duration used for transmitting the first information may be N times the cyclic prefix (CP) duration used for transmitting the synchronization information, or vice versa. Similarly, the tone spacing (e.g., the sub-carrier spacing) used for transmitting the synchronization information may be N times the tone spacing used for transmitting the first information, or vice versa. To mitigate interference between the first and second sets of tones, second synchronization information can be encoded into a guard band in such a way that this information can be interpreted under either the first numerology or the second numerology.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. Moreover, alternate configurations may be devised without departing from the scope of the disclosure. Additionally, well-known elements will not be described in detail or will be omitted so as not to obscure the relevant details of the disclosure.

The various concepts presented throughout this disclosure may be implemented across a broad variety of telecommunication systems, network architectures, and communication standards. For example, the 3rd Generation Partnership Project (3GPP) is a standards body that defines several wireless communication standards for networks involving the evolved packet system (EPS), frequently referred to as long-term evolution (LTE) networks. Evolved versions of the LTE network, such as a fifth-generation (5G) network, may provide for many different types of services or applications, including but not limited to web browsing, video streaming, VoIP, mission critical applications, multi-hop networks, remote operations with real-time feedback (e.g., tele-surgery), etc. Thus, the teachings herein can be implemented according to various network technologies including, without limitation, 5G technology, fourth generation (4G) technology, third generation (3G) technology, and other network architectures. Also, the techniques described herein may be used for a downlink, an uplink, a peer-to-peer link, or some other type of link.

The actual telecommunication standard, network architecture, and/or communication standard used will depend on the specific application and the overall design constraints imposed on the system. For purposes of illustration, the following may describe various aspects in the context of a 5G system and/or an LTE system. It should be appreciated, however, that the teachings herein may be used in other systems as well. Thus, references to functionality in the context of 5G and/or LTE terminology should be understood to be equally applicable to other types of technology, networks, components, signaling, and so on.

Example Communication System

FIG. 1 illustrates an example of a wireless communication system 100 where a user equipment (UE) can communicate with other devices via wireless communication signaling. For example, a first UE 102 and a second UE 104 may communicate with a transmit receive point (TRP) 106 using wireless communication resources managed by the TRP 106 and/or other network components (e.g., a core network 108, an internet service provider (ISP) 110, peer devices, and so on). In some implementations, one or more of the components of the system 100 may communicate with each other directedly via a device-to-device (D2D) link 112 or some other similar type of direct link.

Communication of data and control information between the components of the system 100 may involve communication of synchronization information as well. For example, the TRP 106 may send data or control to the UE 102 via one set of tones and synchronization information via an adjacent set of tones. As another example, the UE 102 may send data or control to the TRP 106 or the UE 104 via one set of tones and synchronization information via an adjacent set of tones. In the event the numerology between the data (or control) signaling is different from the numerology of the synchronization information signaling, a guard band may be used between the tones for the data (or control) and the tones for the synchronization information. To mitigate potential interference between the tones that use different numerologies, second synchronization information (e.g., a copy of some of the synchronization symbols) is carried by the guard band. Accordingly, one or more of the UE 102, the UE 104, the TRP 106, or some other component of the system 100 may include a signaling module 114 that generates signaling whereby a guard band (e.g., between synchronization information and control or data) includes synchronization information. For example, such a guard band may be located between tones used for synchronization and tones used for control or data.

The components and links of the wireless communication system 100 may take different forms in different implementations. For example, and without limitation, UEs may be cellular devices, Internet of Things (IoT) devices, cellular IoT (CIoT) devices, LTE wireless cellular devices, machine-type communication (MTC) cellular devices, smart alarms, remote sensors, smart phones, mobile phones, smart meters, personal digital assistants (PDAs), personal computers, mesh nodes, and tablet computers.

In some aspects, a TRP may refer to a physical entity that incorporates radio head functionality for a particular physical cell. In some aspects, the TRP may include 5G new radio (NR) functionality with an air interface based on orthogonal frequency division multiplexing (OFDM). NR may support, for example and without limitation, enhanced mobile broadband (eMBB), mission-critical services, and wide-scale deployment of IoT devices. The functionality of a TRP may be similar in one or more aspects to (or incorporated into) the functionality of a CIoT base station (C-BS), a NodeB, an evolved NodeB (eNodeB), radio access network (RAN) access node, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other suitable entity. In different scenarios (e.g., NR, LTE, etc.), a TRP may be referred to as a gNodeB (gNB), an eNB, a base station, or referenced using other terminology.

Various types of network-to-device links and D2D links may be supported in the wireless communication system 100. For example, D2D links may include, without limitation, machine-to-machine (M2M) links, MTC links, vehicle-to-vehicle (V2V) links, and vehicle-to-anything (V2X) links. Network-to-device links may include, without limitation, uplinks (or reverse links), downlinks (or forward links), and vehicle-to-network (V2N) links.

Example Communication Using a Guard Band

Figure 2:
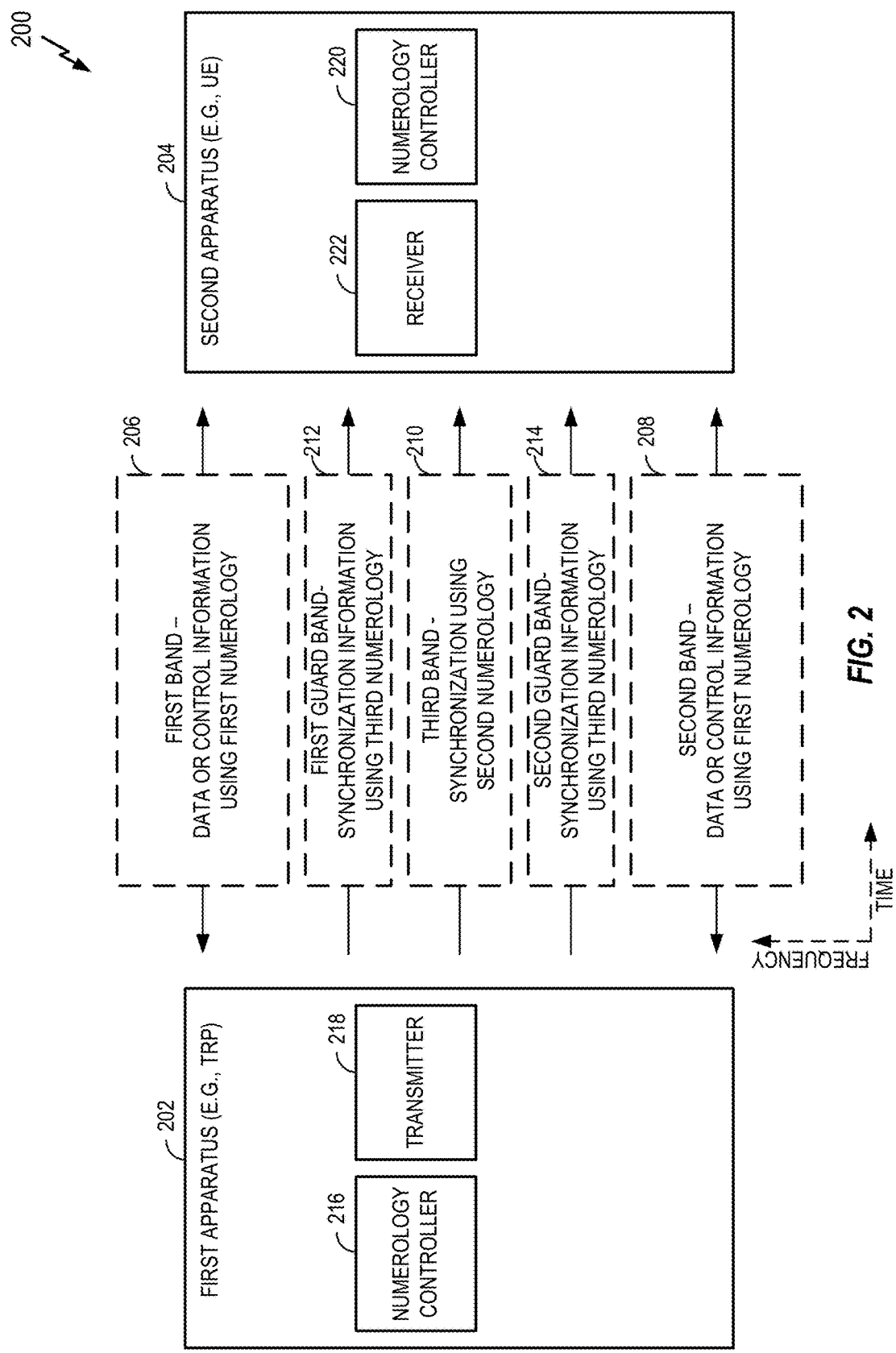
FIG. 2 is a block diagram illustrating an example communication system for communicating using a guard band that includes synchronization information in accordance with some aspects of the disclosure.

FIG. 2 illustrates a communication system 200 where a first apparatus 202 communicates with second apparatus 204. In some implementations, the first apparatus 202 may be a transmit receive point (TRP) and the second apparatus 204 may be a user equipment (UE). In some aspects, the first apparatus 202 may correspond to the TRP 106 of FIG. 1 and the second apparatus 204 may correspond to the UE 102 or the UE 104 of FIG. 1.

At various points in time, different numerologies (e.g., OFDM numerologies) may be used for communicating data and control information and synchronization information. For example, data or control information may be transmitted via a first radio frequency (RF) band 206 (e.g., a first set of tones or sub-carriers) and a second radio frequency (RF) band 208 (e.g., a second set of tones or sub-carriers). In addition, synchronization information may be transmitted via a third RF band 210 (e.g., a third set of tones or sub-carriers) between the first and second RF bands 206 and 208. In some scenarios, the numerology (e.g., OFDM numerology) used for the first and second RF bands 206 and 208 may be different from the numerology used for the third RF band 210. For example, the cyclic prefix (CP) duration (or the tone spacing) used for transmitting the data or control information may be N times the cyclic prefix (CP) duration (or tone spacing) used for transmitting the synchronization information, or vice versa.

To mitigate potential interference between the first RF band 206 and the third RF band 210, a first guard band 212 (e.g., a fourth set of tones or sub-carriers) that includes synchronization information is defined between the first and third RF bands 206 and 210. In addition, a second guard band 214 (e.g., a fifth set of tones or sub-carriers) that includes synchronization information is defined between the second and third RF bands 208 and 210. The guard bands 212 and 214 may use the numerology for the first and second RF bands 206 and 208 or the numerology for the third RF band 210. Accordingly, the first apparatus 202 may include a numerology controller 216 that controls the numerology used by a transmitter 218 for communicating on the first RF band 206, the second RF band 208, the third RF band 210, and the guard bands 212 and 214. For example, the numerology controller 216 may specify that one or more of a physical broadcast channel, secondary synchronization signals, or primary synchronization signals may be sent via the first guard band 212 and/or the second guard band 214.

Similarly, the second apparatus 204 may include a numerology controller 220 that controls the numerology used by a receiver 222 for communicating on the first RF band 206, the second RF band 208, the third RF band 210, and the guard bands 212 and 214. For example, the numerology controller 216 may monitor for one or more of a physical broadcast channel, secondary synchronization signals, or primary synchronization signals in the first guard band 212 and/or the second guard band 214.

The second apparatus 204 (e.g., the receiver 222) may detect primary synchronization signals sent by the first apparatus 202 based on tones received via one or more of the third band 210 (synchronization tones), the first guard band 212 (guard band tones), or the second guard band 214 (guard band tones). Upon detecting received primary synchronization signals, the second apparatus 204 can thereby determine the timing and a coarse frequency offset estimate of signals received from the first apparatus 202.

In addition, the second apparatus 204 (e.g., the receiver 222) may detect secondary synchronization signals sent by the first apparatus 202 based on tones received via one or more of the third band 210, the first guard band 212, or the second guard band 214. Upon detecting received secondary synchronization signals, the second apparatus 204 can thereby determine the physical cell identifier and the frame timing of the first apparatus 202.

Furthermore, the second apparatus 204 (e.g., the receiver 222) may detect a physical broadcast channel sent by the first apparatus 202 based on tones received via one or more of the third band 210, the first guard band 212, or the second guard band 214. Upon detecting a received physical broadcast channel, the second apparatus 204 can thereby extract information broadcast by the first apparatus 202.

Example Guard Band for Scaled Numerology Multiplexing

Figure 3:
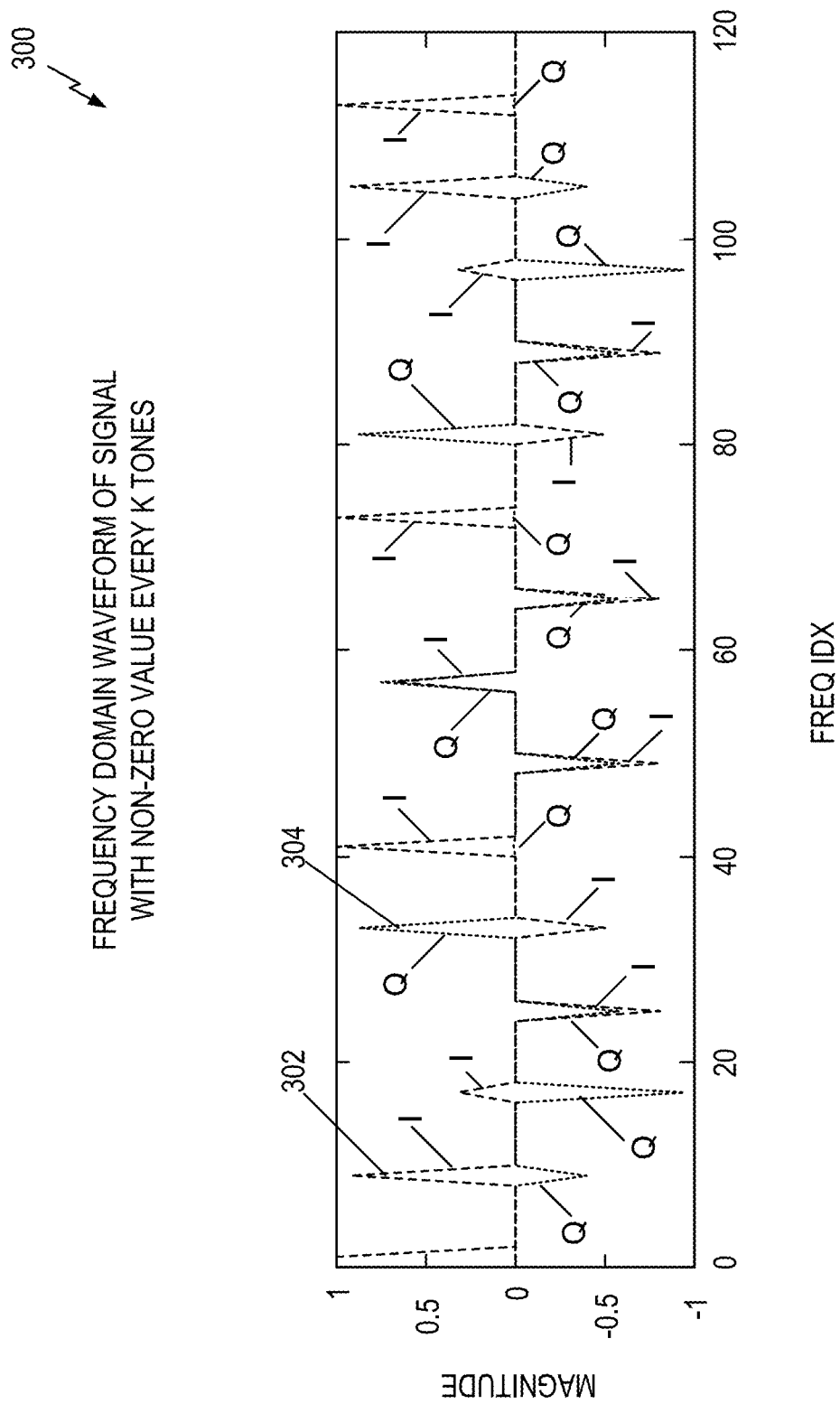
FIG. 3 is a diagram illustrating a frequency domain waveform of a signal with non-zero values every K tones in accordance with some aspects of the disclosure.
Figure 4:
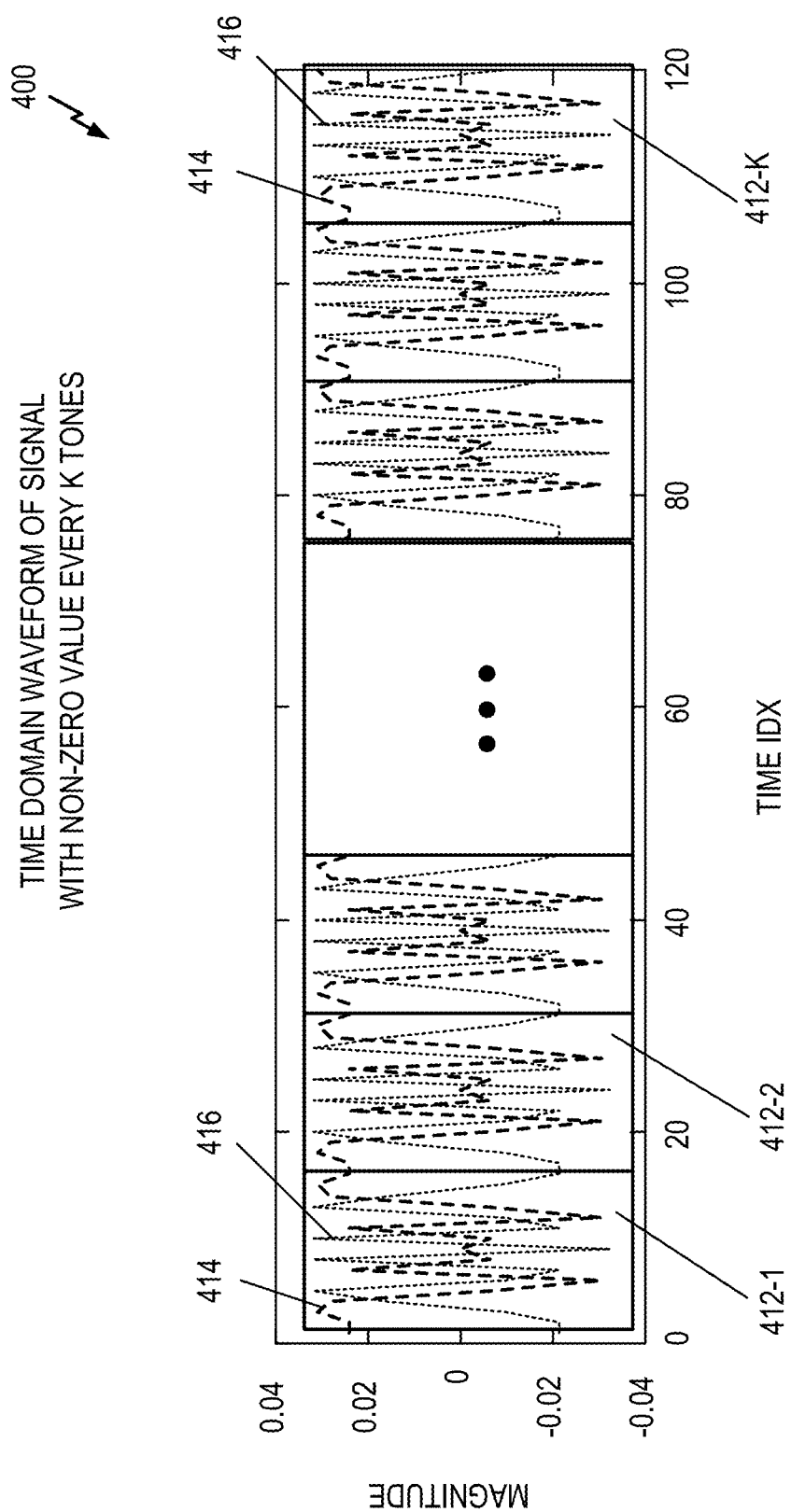
FIG. 4 is a diagram illustrating a time domain waveform of the frequency domain waveform illustrated in FIG. 3 in accordance with some aspects of the disclosure.

FIGS. 3 and 4 illustrate frequency domain and time domain representations, respectively, of a transmission signal. Specifically, FIG. 3 illustrates a frequency domain waveform 300 of a transmission signal that is encoded with non-zero values every K tones. In general, any value for K can be used. The waveform 300 includes an in-phase spectrum 302 and a quadrature spectrum 304 for the transmission signal. Peaks of the in-phase spectrum 302 are labeled I while peaks of the quadrature spectrum 304 are labeled Q. As is illustrated in FIG. 3, the in-phase spectrum 302 and the quadrature spectrum 304 are 0 except for the non-zero frequencies, which as discussed above occur every K tones.

FIG. 4 illustrates the time domain waveform 400 corresponding to the frequency domain waveform 300 of FIG. 3. The waveform 400 includes an in-phase portion 414 and a quadrature portion 416. As illustrated, the waveform 400 is repeated K times, into waveform repetitions 412-1 through 412-K. For example, if K=2, the waveform corresponding to the non-zero values in the frequency domain waveform will be repeated twice (repetitions 412-1 through 412-2). If K=8, then the waveform 400 is repeated 8 times (repetitions 412-1 through 412-8). This waveform allows partial symbol decoding and is useful in constructing a guard band that effectively separates scaled numerology tones, for example, tones associated with a first cyclic prefix (CP1) and tones associated with a second cyclic prefix (CP2), as described below.

Using the discrete Fourier transform (DFT) properties as illustrated in FIGS. 3 and 4, partial-symbol decodable orthogonal frequency division multiplexing (OFDM) coding can be used to multiplex different numerologies and to provide a data transmission scheme in a guard band that separates the different symbol numerologies.

Figure 5:
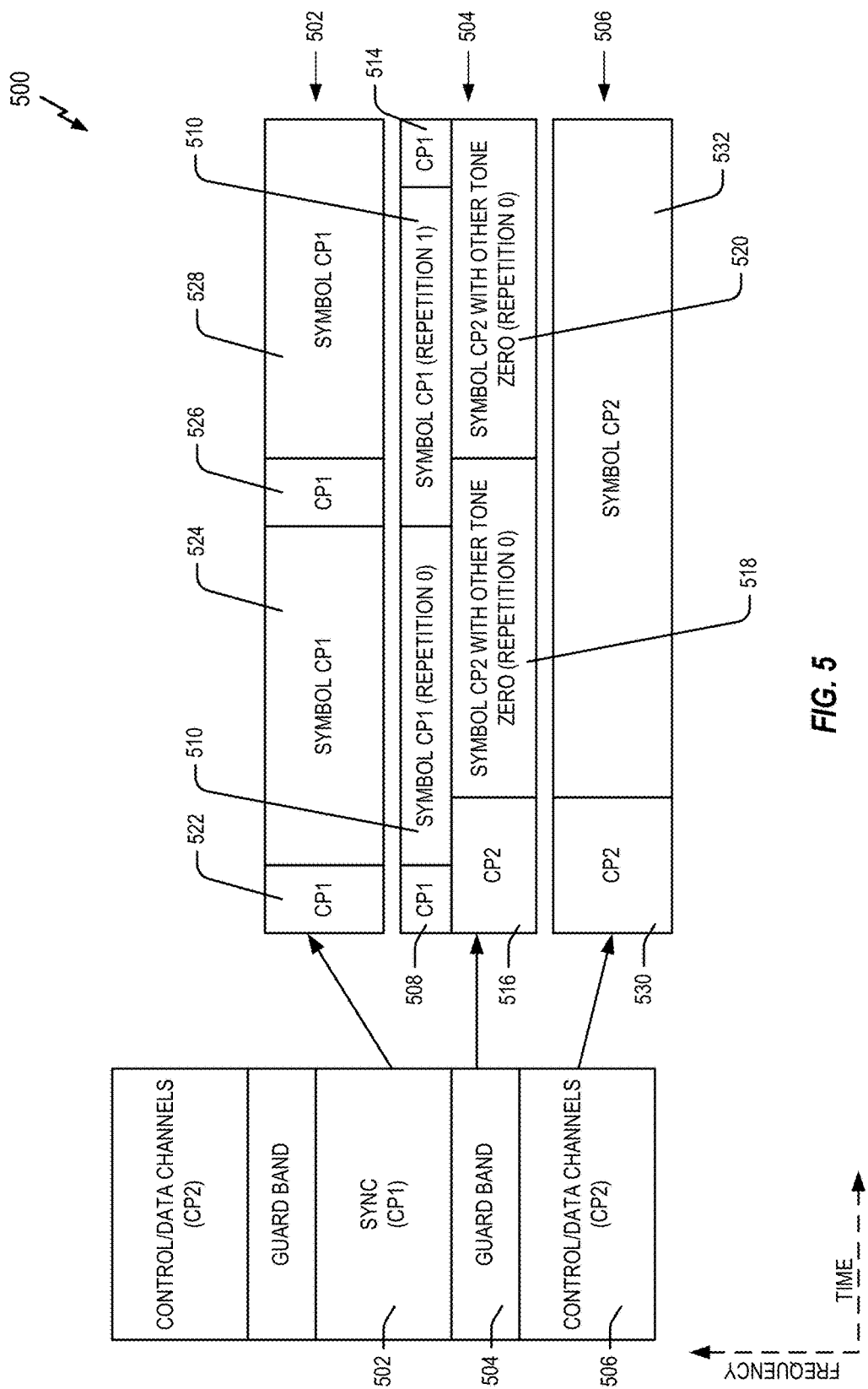
FIG. 5 is a diagram illustrating a multiplexed data transmission including a guard band that carries synchronization information in accordance with some aspects of the disclosure.

FIG. 5 illustrates a frequency versus time map 500 for two numerologies that can then be multiplexed. Two numerologies that may be multiplexed according to some embodiments are normal cyclic prefix (NCP) numerology and extended cyclic prefix (ECP) numerology. Other CP numerologies and other types of numerologies are applicable as well.

For purposes of explanation, the following describes a scaled numerology where the scaling is by a factor of 2. Other scaling factors could be used. With the scaled numerology based on a factor of 2, CP2 may transmit half the number of symbols in a subframe as does CP1 (i.e., 2 CP1 symbols are transmitted in the same time frame as 1 CP2 symbol, with the 1 CP2 symbol having twice the duration as 1 CP1 symbol). As an additional consequence, the tone spacing (e.g., sub-carrier spacing) for CP2 symbol transmission in frequency division multiplexing (FDM) is half that of CP1 symbol transmission. Consequently, orthogonality between the tones used to transmit CP1 information and those used to transmit CP2 information may be lost.

Many parameters are driven by symbol duration (e.g., cyclic prefix overhead). Thus, using scaled numerology multiplexing to simultaneously send two waveforms to meet different requirements (e.g., overhead, latency, link performance, etc.) at the same time may be beneficial. It also may be beneficial to transmit information in the guard band between the frequency bands of the numerologies.

Some implementations include frequency-division-multiplexing (1-DM) numerology multiplexing separated by a guard band (GB). Synchronization information can be transmitted in frames 504 in the guard band, which has non-zero information tones spaced every K tones. In some embodiments, K=2 so that every other tone is zero. A receiver (RX) receives and processes information sent in the guard band to ensure acceptable inter-channel interference (ICI) and inter-symbol interference (ISI) performance and appropriate latency. In general, the guard band information can be impacted by ICI from either the CP1 numerology frames 502 or the CP2 numerology frames 506 depending on receiver processing. One tradeoff on numerology is that the delay spread (DS) impact for some types of cells (e.g., outdoor/macro cells) dictates a longer cyclic prefix (CP) duration than for other types of cells (e.g., indoor/femto cells), as well as a short symbol duration thereby causing relatively high CP overhead. Therefore, a large symbol duration may be used to control the CP overhead.

FIG. 5 further illustrates the use of synchronization transmission in a guard band between frequency bands used for transmission of CP1 numerology frames 502 and CP2 numerology information frames 506. The CP1 numerology frame 502 is transmitted in a first set of tones while the CP2 numerology frame 506 is transmitted by a second set of tones. The first set of tones and the second set of tones are separated by the guard band, where guard band frames 504 are transmitted at a set of guard band tones. In the particular example shown in FIG. 5, CP2 numerology information frames 506 are transmitted using lower frequency tones and CP1 numerology information frames 502 are transmitted at higher frequency tones. The guard band frames 504, transmitted in the guard band, are at guard band tones between the CP2 numerology tones and the CP1 numerology tones.

As illustrated at the right hand side of FIG. 5, the map 500 shows expanded versions of the CP1 numerology frame 502, the CP2 numerology frame 506, and the guard band frame 504 in intermediate tones between the CP1 numerology frame 502 and the CP2 numerology frame 506. In this example, the CP1 numerology frame 502 includes a first CP 522, a first symbol 524, a second CP 526, and a second symbol 528. The CP2 numerology frame 506 includes a CP 530 and a symbol 532. As illustrated in FIG. 5, the CP1 numerology frame 502 and the CP2 numerology frame 506 have the same duration. The guard band frame 504 can be interpreted by a receiver as either an CP1 frame or an CP2 frame.

FIG. 5 further illustrates the individual timing of the waveforms of the information symbols transmitted. The guard band uses non-zero transmission every K tones, as discussed above with FIGS. 3 and 4. In one example, K=2 so that the waveforms are repeated. Information can be transmitted in the guard band such that it can be viewed and processed either as CP1 numerology information or as CP2 numerology information.

As illustrated in FIG. 5, guard band frames 504 viewed as CP1 can include repetition of the same CP1 symbol 510, the first copy with an attached prefix (CP) 508 and the second copy with an attached postfix 514. In some embodiments, the guard band frame 504 can be interpreted as two CP1 symbols, both symbols with a prefix CP.

FIG. 5 also illustrates that guard band information can be viewed as CP2 with partial-symbol decodable property (or interleaved-FDMA property). Here, a CP 516 precedes symbols 518 and 520. With K=2, as is illustrated in FIG. 5, every other tone is zero, and the transmitted waveform is repeated in pairs.

By defining the guard bands in accordance with the teachings herein, tones in the guard band might not introduce ICI to either CP1 information transmitted in the CP1 band or CP2 information transmitted in the CP2 band. Tones in the guard band can be decoded with limited ICI as either CP1 frames or CP2 frames.

In some multiplexing, K may be set at other values. In particular, K can be set according to the numerologies that are being multiplexed. For example, for multiplexing outdoor and indoor numerologies, K may be set to four (4) so that the waveform of the guard band information transmission may be repeated four times. In general, K is related to the ratio of the number of symbols transmitted by the first numerology and the second numerology in a given time period.

Figure 6:
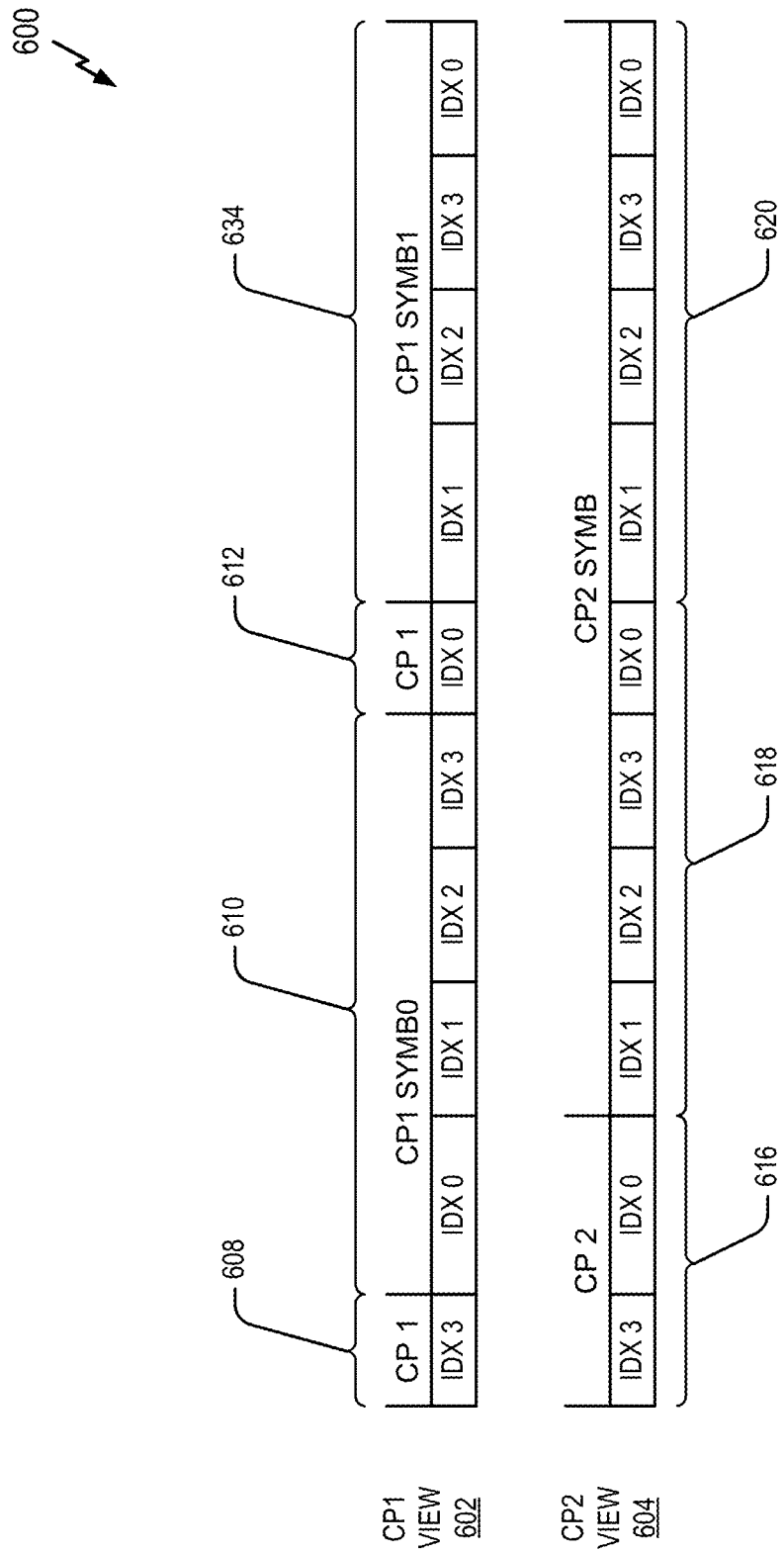
FIG. 6 is a diagram illustrating an equivalence between a first waveform according to a first cyclic prefix duration and a second waveform according to a second cyclic prefix duration in accordance with some aspects of the disclosure.

FIG. 6 illustrates alignment, or multiplexing, of a guard band frame 600. As discussed above, the guard band frame 600 can include transmitted synchronization information and can be interpreted either under the CP1 numerology or the CP2 numerology. In the example of FIG. 6, the guard band frame 600 includes a repeating waveform with waveform segments idx0, idx1, idx2, and idx3. The guard band frame 600 is aligned so that the order of the repeating waveform is idx3, idx0, idx1, idx2 and repeating. As such, under a CP1 interpretation (CP1 view 602), CP 608 is idx3, CP1 symbol 610 is formed of idx0, idx1, idx2 and idx3, CP 612 is formed of idx0, and CP1 symbol 634 is formed of idx1, idx2, idx3 and idx0. However, if interpreted under an CP2 interpretation (CP2 view 604), the CP2 CP 616 is idx3 and idx0 while the CP2 symbol, formed of repeated symbols 618 and 620, is given by idx1, idx2, idx3, idx0, idx1, idx2, idx3, and idx0. Under either interpretation, the information encoded in the waveform of guard band frame 600 can be recovered.

As discussed above, FIG. 6 illustrates the equivalence, with every other tone being 0 (K=2), between CP2 numerology and CP1 numerology. The waveform is repeated and includes cyclically shifted symbols represented by signal segments idx0, idx1, idx2, and idx3. The waveform can start with segment (idx) 3 and process through waveform segment idx0 through idx3 twice, finishing with waveform segment idx0. Consequently, a first CP1 symbol is formed of waveform segments idx0, idx1, idx2, idx3 while a second CP1 symbol is formed of waveform segments idx1, idx2, idx3, idx0 (repetition of the waveform with phase ramp in frequency, which ensures a continuous phase waveform in the time domain accounting for CP). Note that in the arrangement illustrated in FIG. 6, the symbol 610 is repeated and the post CP 612 is idx0.

Viewing the same waveform as CP2 numerology, then, results in an CP2 that includes segments idx3 and idx0 and a repeated CP2 symbol formed of segments idx1, idx2, idx3, idx0. With this equivalence, the waveform in the guard band could be interpreted as either CP1 or CP2 numerology, hence not interfering either side. A receiver can receive the guard band information as either CP1 or CP2 numerology and recover the transmitted information even with ICI from either the CP2 side or the CP1 side.

A given cell may be deployed with a default numerology based on the cell size and other requirements. In accordance with the teachings herein, different numerologies can be multiplexed as discussed above within the same cell. For example, a CP1 mission-critical (MiCr) user equipment (UE) numerology, in some cases with pre-equalization, can be used to meet latency requirements. Conversely, a CP2 nominal high throughput UE can be used to meet low ICI/ISI noise floor requirements. In FDM, a guard band (GB) with a partial-decodable symbol structure can be used to control ICI. ICI between CP1 and CP2 nominal numerologies can be mitigated by a guard band (for example of width<1 MHz) plus a weighted overlap add (WOLA) processing (e.g., $\frac{1}{16}$ to $\frac{1}{8}$ of symbol duration). In contrast, because of the CP1 MiCr latency requirements, time-division multiplexing (TDM) might not be a feasible solution.

As discussed above, CP1 and CP2 can be multiplexed where CP1 and CP2 tones are separated by a guard band with partial-symbol decodable tones to ensure negligible ICI from the guard band to either CP1 or CP2 information tone regions. Residual CP1 to CP2 ICI can be managed by WOLA processing and the separation of the guard band.

Flexible Numerology for Synchronization

Synchronization (SYNC) channels may be used to enable a UE to acquire at least one of: timing synchronization, frequency synchronization, cell identifier (ID) detection, system information, or any combination thereof. SYNC channels may include, for example, primary synchronization signals (PSS), secondary synchronization signals (SSS), and a physical broadcast channel (PBCH).

A SYNC channel might have its own numerology which could be different from the downlink (DL) control channel numerology, the downlink data channel numerology, or the numerology of some other channel. As discussed above, a difference in numerology may cause interference between bands. In accordance with the teachings herein, a guard band may be used to mitigate interference from the SYNC channel to other downlink channels and vice versa.

A SYNC channel tone spacing, hereafter referred to as a sub-carrier spacing (SCS), might be a scaled version of another downlink channel SCS. For example, the SYNC channel SCS could be 30 kHz and downlink control/data channel SCS could be {15, 30, 60, or 120} kHz.

One approach to create the guard band is to simply zero-out some of the tones that are adjacent to the SYNC channel. However, this approach might not be efficient with respect to time-frequency resource usage.

In accordance with the teachings herein, a more efficient approach may involve using a flexible guard band (which may be referred to herein as FlexGuard). This guard band may be a frequency division multiplexed (FUM) guard band that carries payload.

Figure 7:
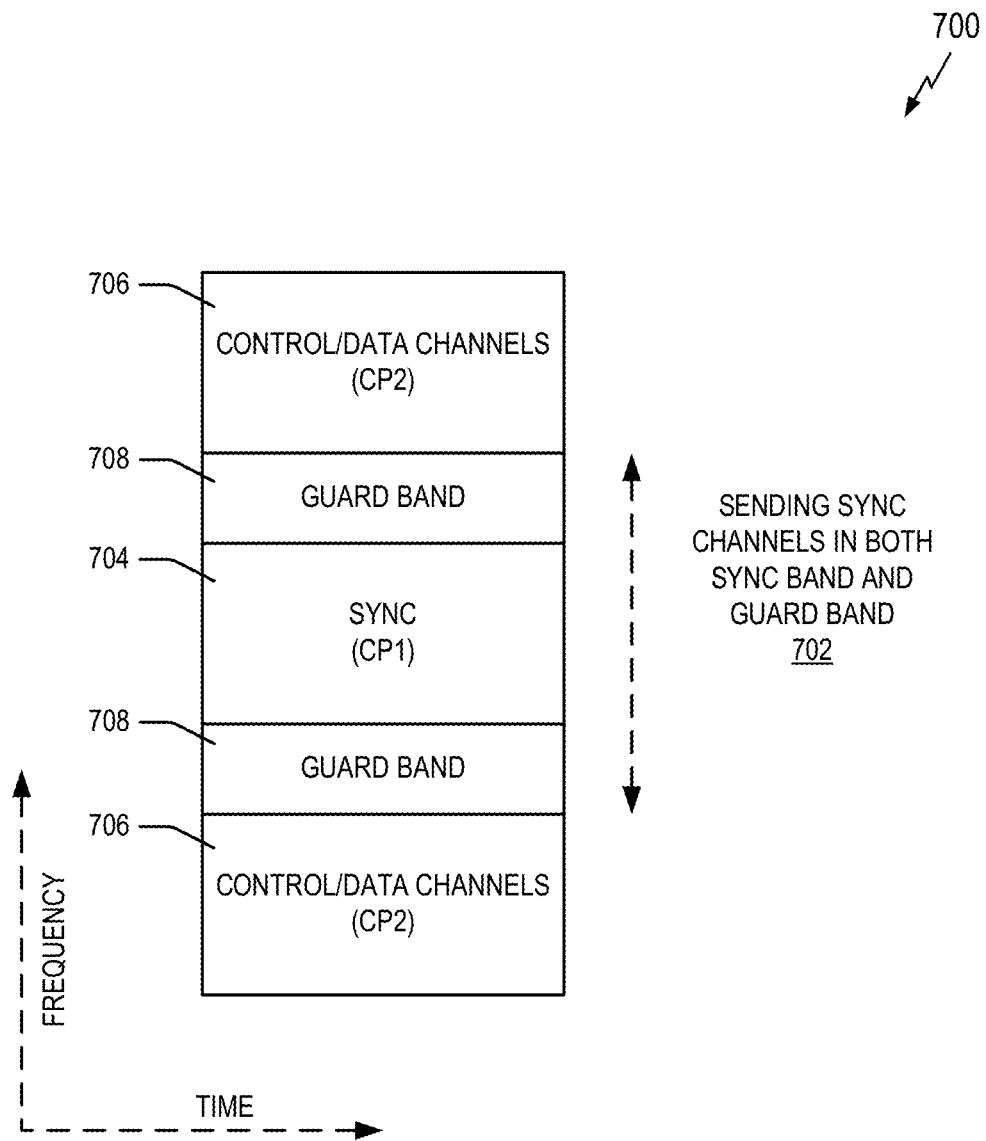
FIG. 7 is a diagram illustrating communication bands in accordance with some aspects of the disclosure.

Referring to FIG. 7, the SYNC channels (e.g., PSS, SSS and PBCH) could be transmitted both in resources 702 reserved for SYNC and the guard band. The numerology (e.g., CP1) of the signals transmitted in a SYNC band 704 could be different from the numerology (e.g., CP2) of the signals transmitted in a control channel and/or data channel band 706. The numerology (e.g., CP1) of the signals transmitted in the SYNC band 704 could be different from the numerology of the signals transmitted in a flexible guard band 708.

Figure 8:
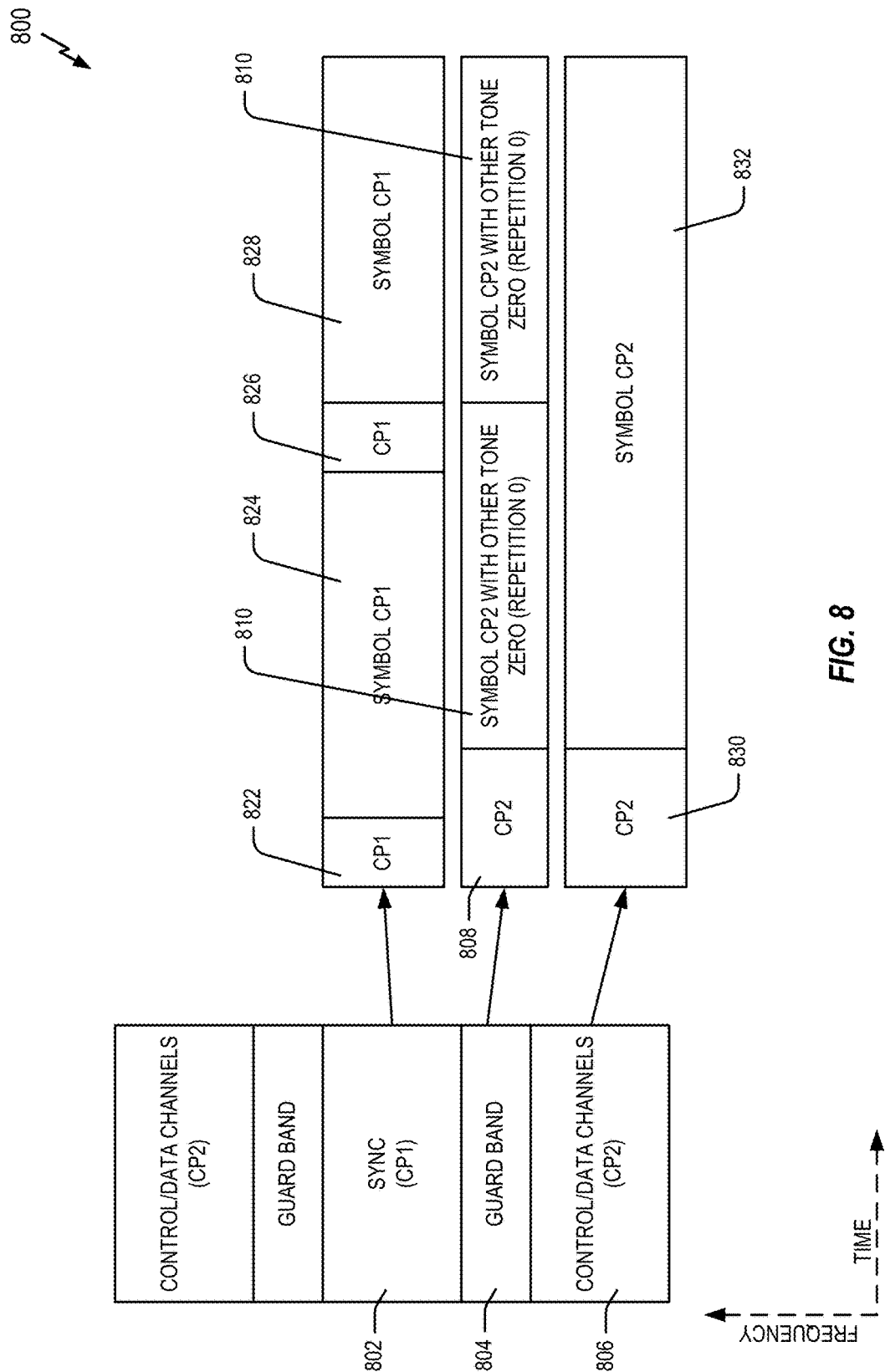
FIG. 8 is a diagram illustrating a multiplexed data transmission including a guard band that carries synchronization information in accordance with some aspects of the disclosure.

FIG. 8 illustrates a frequency versus time map 800 for a first flexible guard band example. Here, CP1=0.5*CP2 or SCS1=2*SCS2. For example, SCS1=30 kHz and SCS2=15 kHz. In this example, the numerology (e.g., CP2) of the guard band (FlexGuard) is the same as the numerology (e.g., CP2) for the control channel and/or the data channel. In addition, the guard band signals (symbols) are transmitted in alternative tones with the other tones being zeroed out. This arrangement is further illustrated in FIG. 10 discussed below.

In FIG. 8, synchronization information is transmitted in a guard band between frequency bands used for transmission of CP1 numerology frames 802 and CP2 numerology information frames 806. The CP1 numerology frame 802 is transmitted in a first set of tones while the CP2 numerology frame 806 is transmitted by a second set of tones. The first set of tones and the second set of tones are separated by the guard band, where guard band frames 804 are transmitted as a set of guard band tones with numerology CP2.

As illustrated at the right hand side of FIG. 8, the map 800 shows expanded versions of the CP1 numerology frame 802, the CP2 numerology frame 806, and the guard band frame 804. In this example, guard band frames 804 can include a CP 808 that precedes symbols 810. Here, every other tone is zero, and the transmitted waveform is repeated in pairs. In addition, the CP1 numerology frame 802 includes a first CP 822, a first symbol 824, a second CP 826, and a second symbol 828. The CP2 numerology frame 806 includes a CP 830 and a symbol 832. As illustrated in FIG. 8, the CP1 numerology frame 802 and the CP2 numerology frame 806 have the same duration.

Figure 9:
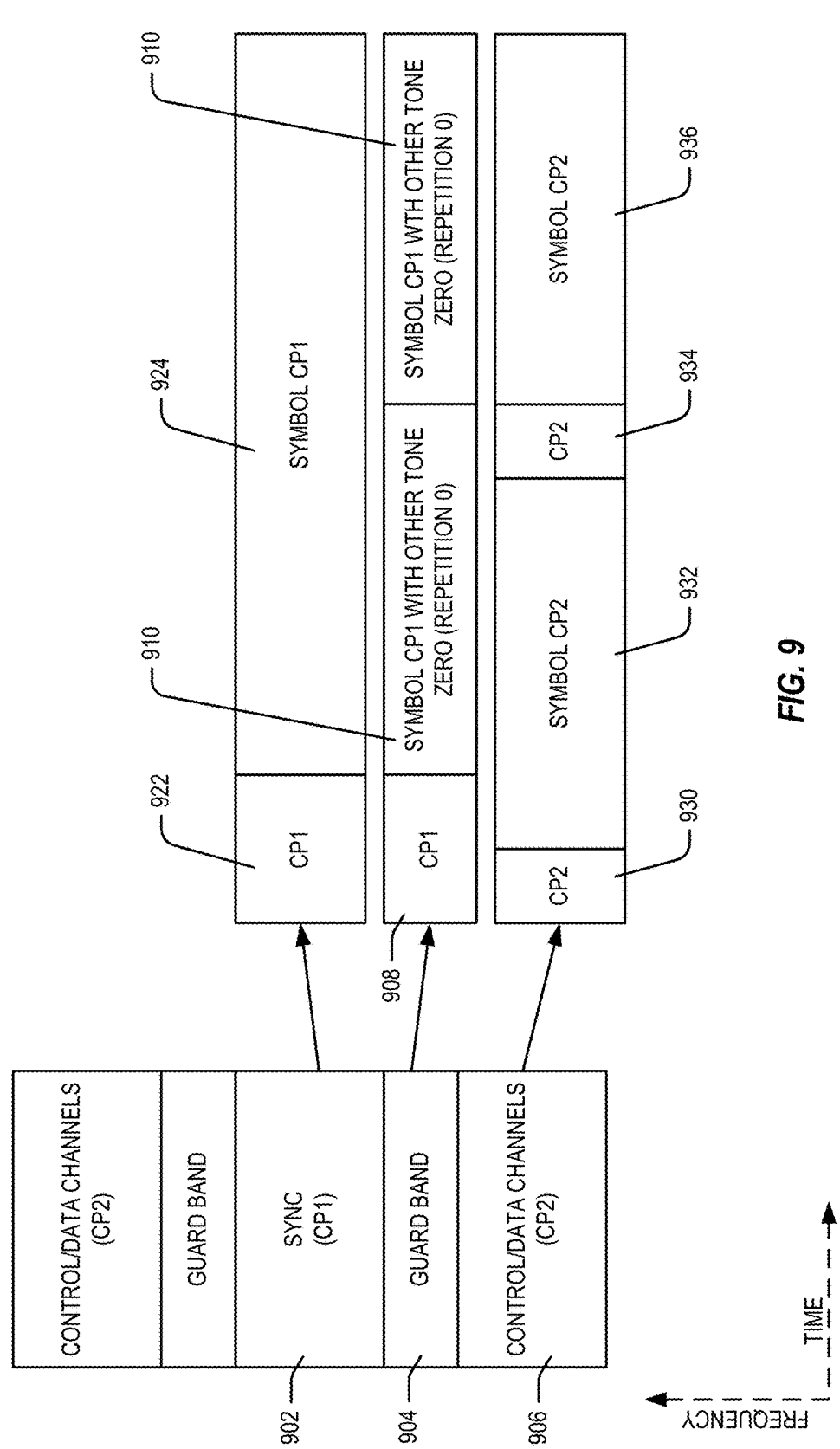
FIG. 9 is a diagram illustrating another multiplexed data transmission including a guard band that carries synchronization information in accordance with some aspects of the disclosure.

FIG. 9 illustrates a frequency versus time map 900 for a second flexible guard band example. Here, CP1=2*CP2 or SCS1=0.5*SCS2. For example, SCS1=30 kHz and SCS2=60 khz. In this example, the numerology (e.g., CP1) of the guard band (FlexGuard) is the same as the numerology (e.g., CP1) for the SYNC channel. Again, the guard band signals (symbols) are transmitted in alternative tones with the other tones being zeroed out.

In FIG. 9, synchronization information is transmitted in a guard band between frequency bands used for transmission of CP1 numerology frames 902 and CP2 numerology information frames 906. The CP1 numerology frame 902 is transmitted in a first set of tones while the CP2 numerology frame 906 is transmitted by a second set of tones. The first set of tones and the second set of tones are separated by the guard band, where guard band frames 904 are transmitted as a set of guard band tones with numerology CP1.

As illustrated at the right hand side of FIG. 9, the map 900 shows expanded versions of the CP1 numerology frame 902, the CP2 numerology frame 906, and the guard band frame 904. In this example, guard band frames 904 can include a CP 908 that precedes symbols 910. The CP1 numerology frame 902 includes a first CP 922 and a first symbol 924. The CP2 numerology frame 906 includes a first CP 930, a first symbol 932, a second CP 934, and a second symbol 936. As illustrated in FIG. 9, the CP1 numerology frame 902 and the CP2 numerology frame 906 have the same duration.

Figure 10:
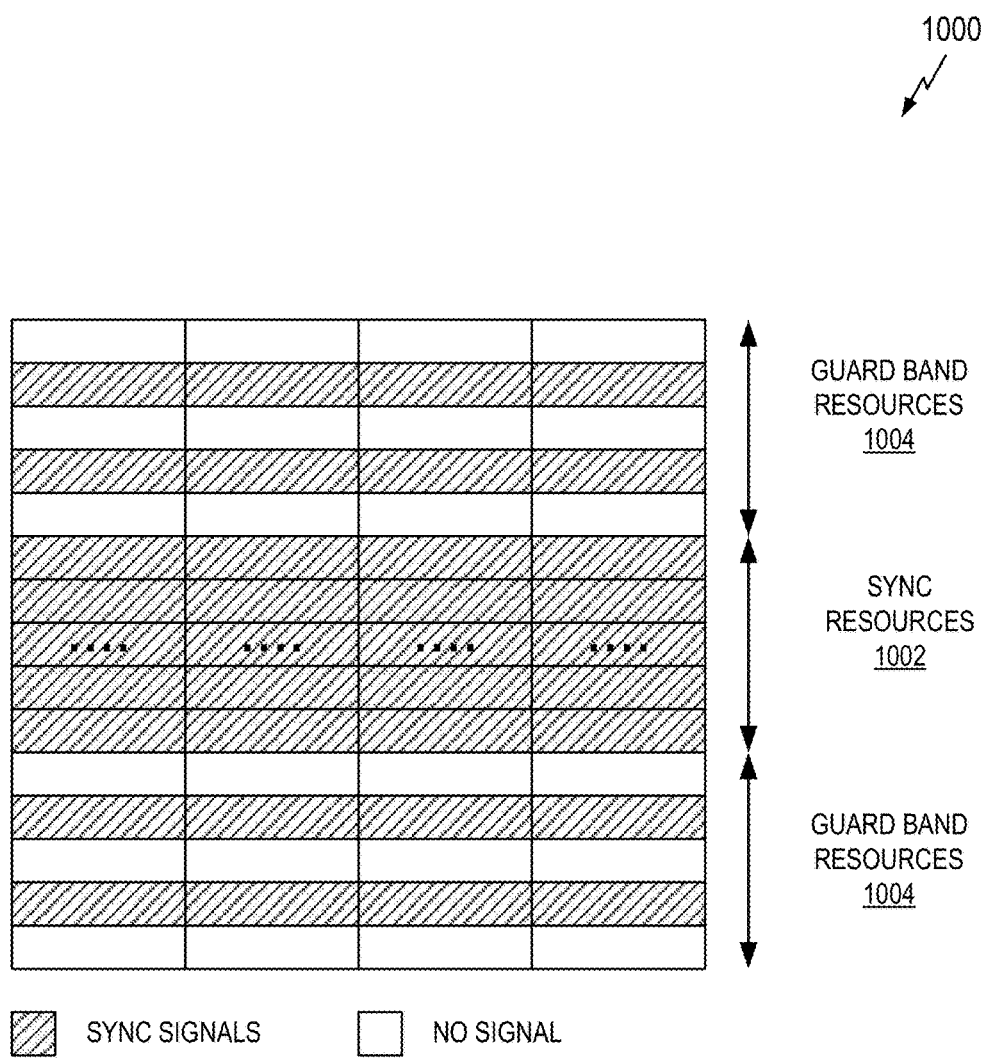
FIG. 10 is another diagram illustrating communication bands in accordance with some aspects of the disclosure.

FIG. 10 illustrates a frequency versus time map 1000 including SYNC channels and associated guard bands for a first signal transmission example. Here, the SYNC channels are transmitted in all of the SYNC resources 1002 (e.g., SYNC tones). For the case where the resources 1104 for the guard bands (FlexGuard) are tones, additional SYNC signals are sent over every N tones with the other tones being zero. In some aspects, N depends on the numerologies of the SYNC channels and the numerologies of the channels in resource blocks (RBs) adjacent to the SYNC channels.

Figure 11:
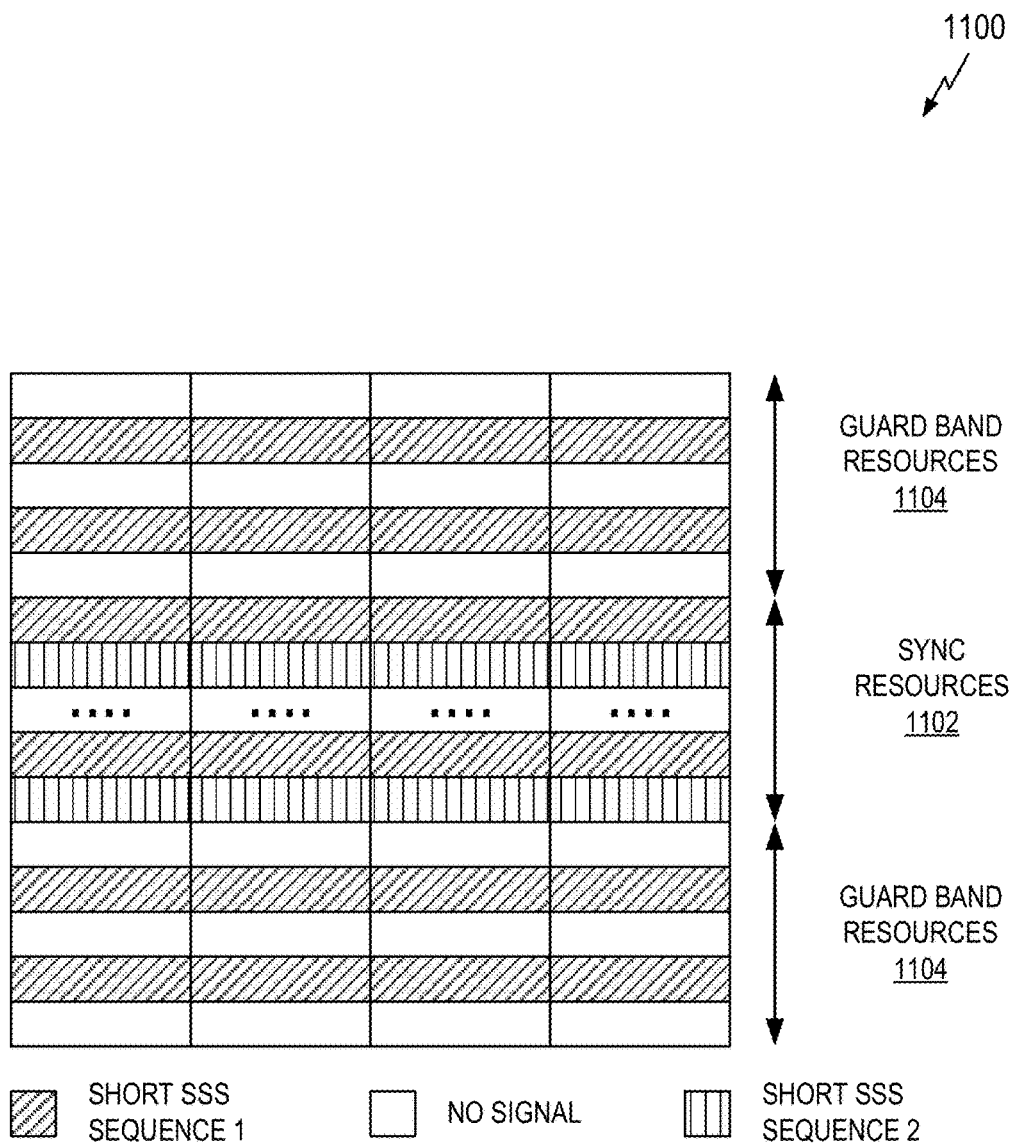
FIG. 11 is another diagram illustrating communication bands in accordance with some aspects of the disclosure.

FIG. 11 illustrates a frequency versus time map 1100 including SYNC channels and associated guard bands for a second signal transmission example. Here, SYNC channels are transmitted in all of the SYNC resources 1102 (e.g., SYNC tones). The SYNC channels may include SSS transmitted using two short sequences: short SSS sequence 1 and short SSS sequence 2.

The short SSS sequence 1 may be transmitted in alternate tones (e.g., the even tones) of the SYNC resources 1102. Alternate tones of the short SSS sequence 1 may also be included in the guard band resources 1104.

The short SSS sequence 2 may be transmitted in the other tones (e.g., the odd tones) of the SYNC resources 1102. These "other" tones may then be "zeroed out" in the guard band resources 1104. That is, the short SSS sequence 2 signals are not transmitted in the guard band in this example. It should be appreciated, however, that in other examples, the guard band could include signals for the short SSS sequence 1 and/or signals for the short SSS sequence 2.

Power control could be applied to reduce the ICI impact. For example, power control might be applied on transmitting the short SSS sequence 1, or other signals.

Figure 12:
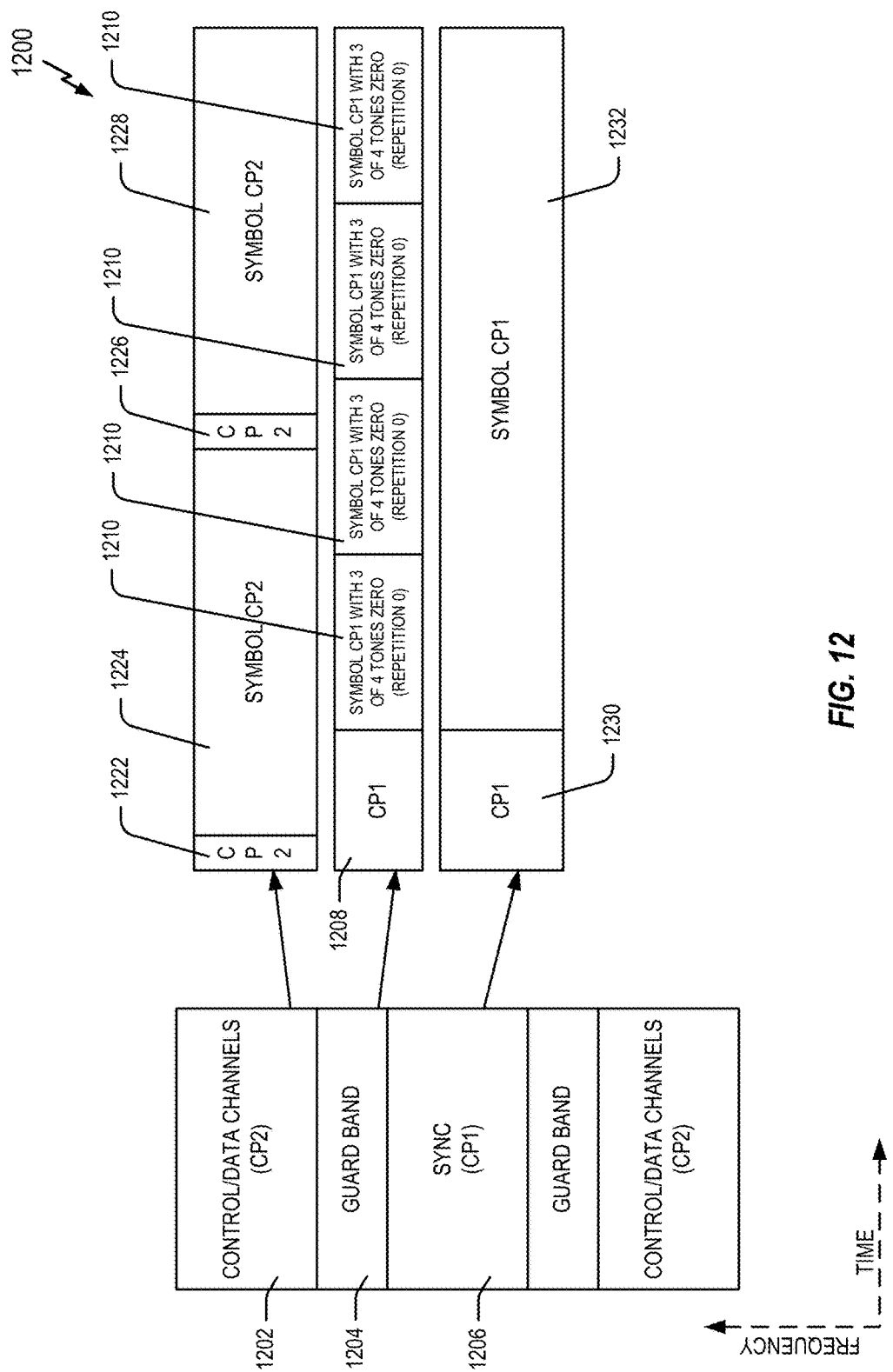
FIG. 12 is a diagram illustrating another multiplexed data transmission including a guard band that carries synchronization information in accordance with some aspects of the disclosure.
Figure 13:
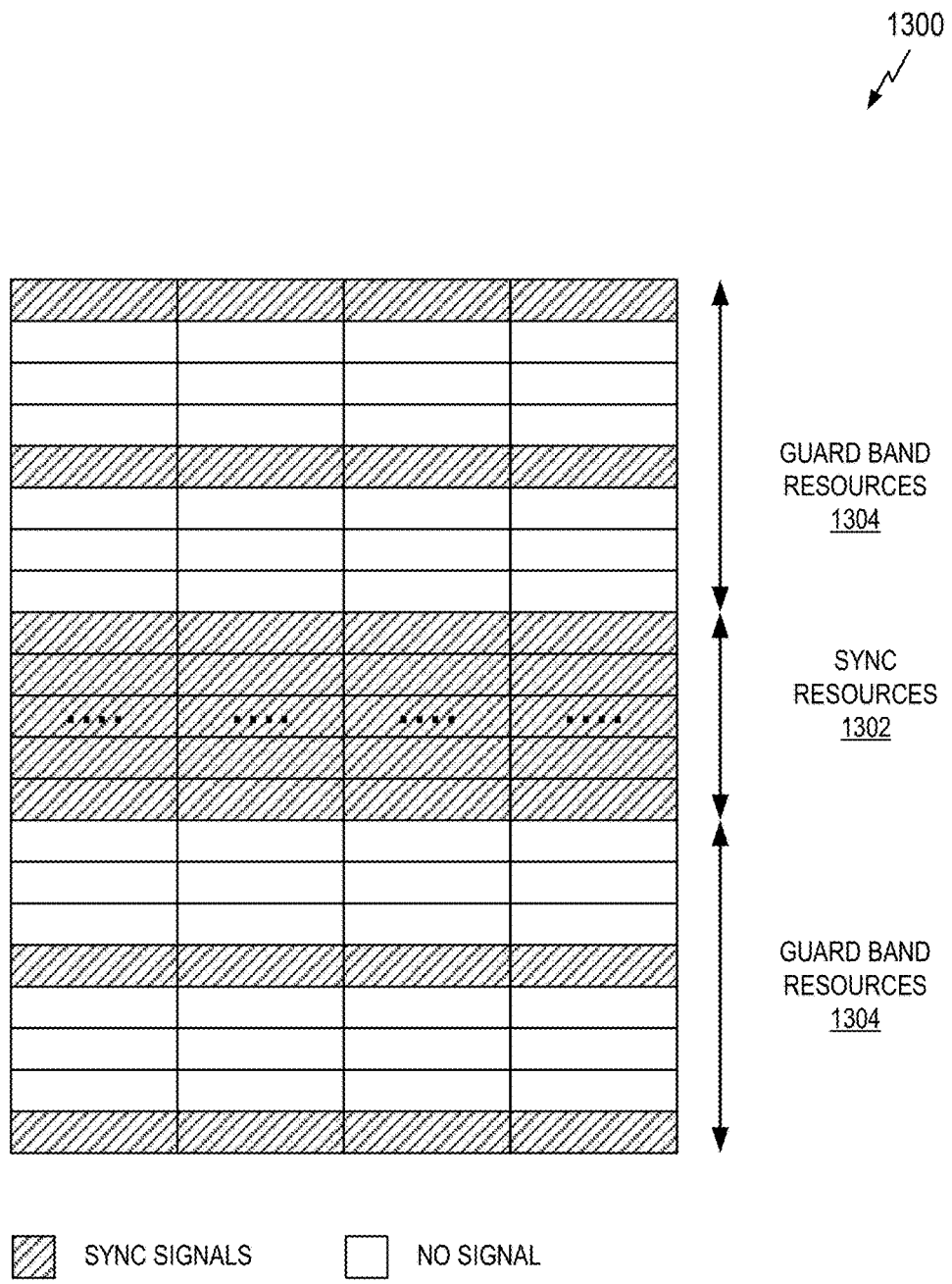
FIG. 13 is another diagram illustrating communication bands in accordance with some aspects of the disclosure.

As discussed above, N may take different values in different implementations. FIGS. 12 and 13 illustrate examples of frequency versus time maps 1200 and 1300, respectively, where N is 4.

FIG. 12 illustrates a frequency versus time map 1200 where CP1=0.25*CP2 or SCS1=4*SCS2. For example, SCS1=60 khz and SCS2=15 khz. In this example, the numerology (e.g., CP1) of the guard band is the same as the numerology (e.g., CP1) for the synchronization channel. In addition, the flexible guard band (FlexGuard) signals (symbols) are transmitted in alternative tones with the other tones being zeroed out. This arrangement is further illustrated in FIG. 13.

In FIG. 12, synchronization information is transmitted in a guard band between frequency bands used for transmission of CP1 numerology frames 1206 and CP2 numerology information frames 1202. The CP1 numerology frame 1206 is transmitted in a first set of tones while the CP2 numerology frame 1202 is transmitted by a second set of tones. The first set of tones and the second set of tones are separated by the guard band, where guard band frames 1204 are transmitted as a set of guard band tones with numerology CP1.

As illustrated at the right hand side of FIG. 12, the map 1200 shows expanded versions of the CP1 numerology frame 1206, the CP2 numerology frame 1202, and the guard band frame 1204. In this example, guard band frames 1204 can include a CP 1208 that precedes symbols 1210. Here, every three out of four tones is zero, and the transmitted waveform is repeated in quadrature. The CP2 numerology frame 1202 includes a first CP 1222, a first symbol 1224, a second CP 1226, and a second symbol 1228. The CP1 numerology frame 1206 includes a CP 1230 and a symbol 1232. As illustrated in FIG. 12, the CP1 numerology frame 1206 and the CP2 numerology frame 1202 have the same duration.

FIG. 13 illustrates a frequency versus time map 1300 including SYNC channels and associated guard bands for another signal transmission example. Here, the SYNC channels are transmitted in all of the SYNC resources 1302 (e.g., tones). For the case where the resources 1304 for the flexible guard bands (FlexGuard) are tones, additional SYNC signals are sent over every four tones with the other tones being zero.

Example Apparatus

Figure 14:
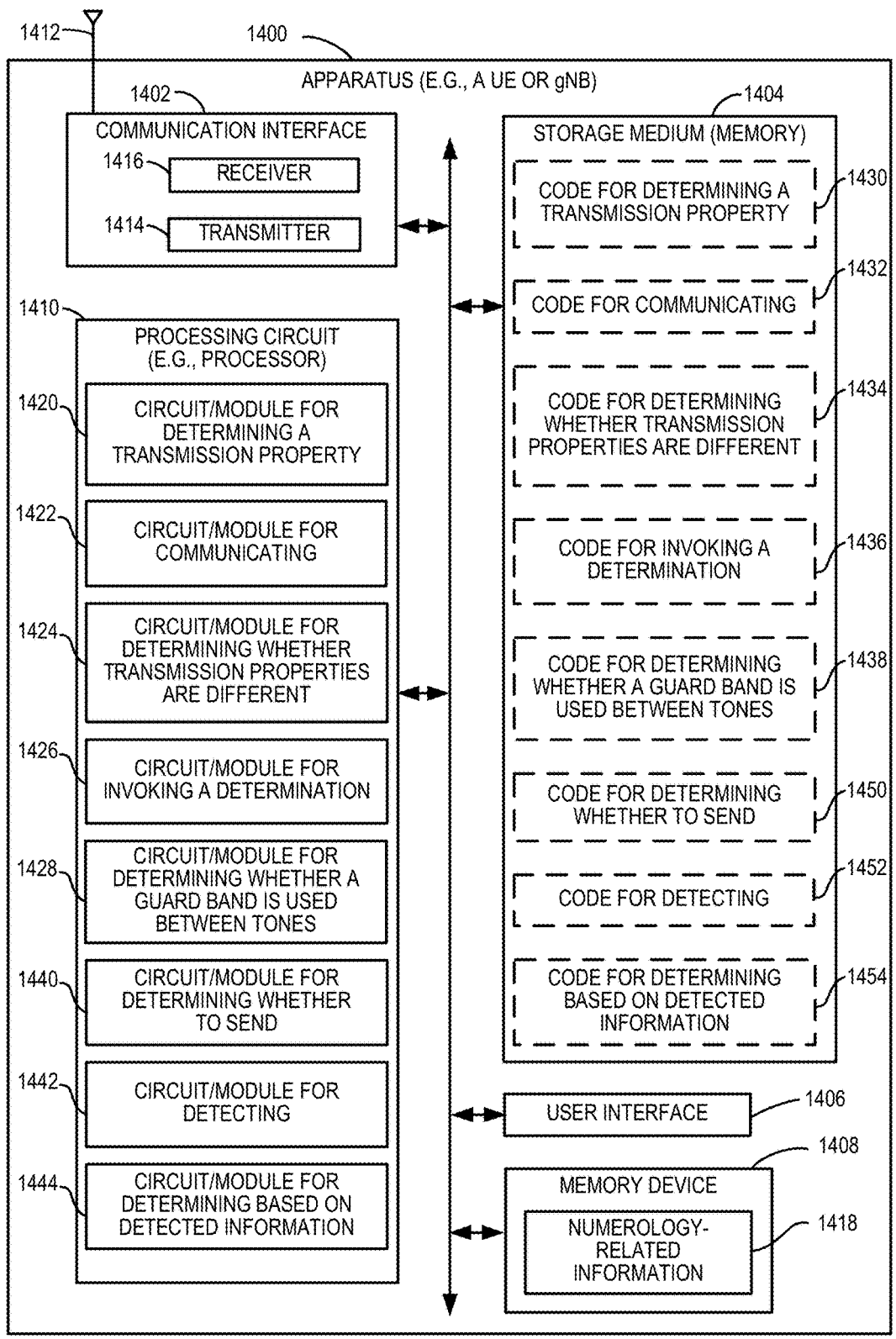
FIG. 14 is a block diagram illustrating an example hardware implementation for an apparatus (e.g., an electronic device) that can support communication in accordance with some aspects of the disclosure.

FIG. 14 illustrates a block diagram of an example hardware implementation of an apparatus 1400 configured to communicate according to one or more aspects of the disclosure. The apparatus 1400 could embody or be implemented within a UE, a TRP, a base station (BS), or some other type of device that supports wireless communication. In various implementations, the apparatus 1400 could embody or be implemented within an access terminal, an access point, or some other type of device. In various implementations, the apparatus 1400 could embody or be implemented within a server, a network entity, a mobile phone, a smart phone, a tablet, a portable computer, a server, a personal computer, a sensor, an entertainment device, a medical device, or any other electronic device having circuitry.

The apparatus 1400 includes a communication interface 1402 (e.g., at least one transceiver), a storage medium 1404, a user interface 1406, a memory device (e.g., a memory circuit) 1408, and a processing circuit 1410 (e.g., at least one processor). In various implementations, the user interface 1406 may include one or more of: a keypad, a display, a speaker, a microphone, a touchscreen display, of some other circuitry for receiving an input from or sending an output to a user.

These components can be coupled to and/or placed in electrical communication with one another via a signaling bus or other suitable component, represented generally by the connection lines in FIG. 14. The signaling bus may include any number of interconnecting buses and bridges depending on the specific application of the processing circuit 1410 and the overall design constraints. The signaling bus links together various circuits such that each of the communication interface 1402, the storage medium 1404, the user interface 1406, and the memory device 1408 are coupled to and/or in electrical communication with the processing circuit 1410. The signaling bus may also link various other circuits (not shown) such as timing sources, peripherals, voltage regulators, and power management circuits, which are well known in the art, and therefore, will not be described any further.

The communication interface 1402 provides a means for communicating with other apparatuses over a transmission medium. In some implementations, the communication interface 1402 includes circuitry and/or programming adapted to facilitate the communication of information bi-directionally with respect to one or more communication devices in a network. In some implementations, the communication interface 1402 is adapted to facilitate wireless communication of the apparatus 1400. Thus, in some implementations, the communication interface 1402 may be coupled to one or more antennas 1412 as shown in FIG. 14 for wireless communication within a wireless communication system. In some implementations, the communication interface 1402 may be configured for wire-based communication. For example, the communication interface 1402 could be a bus interface, a send/receive interface, or some other type of signal interface including drivers, buffers, or other circuitry for outputting and/or obtaining signals (e.g., outputting signal from and/or receiving signals into an integrated circuit). The communication interface 1402 can be configured with one or more standalone receivers and/or transmitters, as well as one or more transceivers. In the illustrated example, the communication interface 1402 includes a transmitter 1414 and a receiver 1416. The communication interface 1402 serves as one example of a means for receiving and/or means transmitting.

The memory device 1408 may represent one or more memory devices. As indicated, the memory device 1408 may maintain numerology information 1418 along with other information used by the apparatus 1400. In some implementations, the memory device 1408 and the storage medium 1404 are implemented as a common memory component. The memory device 1408 may also be used for storing data that is manipulated by the processing circuit 1410 or some other component of the apparatus 1400.

The storage medium 1404 may represent one or more computer-readable, machine-readable, and/or processor-readable devices for storing programming, such as processor executable code or instructions (e.g., software, firmware), electronic data, databases, or other digital information. The storage medium 1404 may also be used for storing data that is manipulated by the processing circuit 1410 when executing programming. The storage medium 1404 may be any available media that can be accessed by a general purpose or special purpose processor, including portable or fixed storage devices, optical storage devices, and various other mediums capable of storing, containing or carrying programming.

By way of example and not limitation, the storage medium 1404 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 1404 may be embodied in an article of manufacture (e.g., a computer program product). By way of example, a computer program product may include a computer-readable medium in packaging materials. In view of the above, in some implementations, the storage medium 1404 may be a non-transitory (e.g., tangible) storage medium.

The storage medium 1404 may be coupled to the processing circuit 1410 such that the processing circuit 1410 can read information from, and write information to, the storage medium 1404. That is, the storage medium 1404 can be coupled to the processing circuit 1410 so that the storage medium 1404 is at least accessible by the processing circuit 1410, including examples where at least one storage medium is integral to the processing circuit 1410 and/or examples where at least one storage medium is separate from the processing circuit 1410 (e.g., resident in the apparatus 1400, external to the apparatus 1400, distributed across multiple entities, etc.).

Programming stored by the storage medium 1404, when executed by the processing circuit 1410, causes the processing circuit 1410 to perform one or more of the various functions and/or process operations described herein. For example, the storage medium 1404 may include operations configured for regulating operations at one or more hardware blocks of the processing circuit 1410, as well as to utilize the communication interface 1402 for wireless communication utilizing their respective communication protocols.

The processing circuit 1410 is generally adapted for processing, including the execution of such programming stored on the storage medium 1404. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1410 is arranged to obtain, process and/or send data, control data access and storage, issue commands, and control other desired operations. The processing circuit 1410 may include circuitry configured to implement desired programming provided by appropriate media in at least one example. For example, the processing circuit 1410 may be implemented as one or more processors, one or more controllers, and/or other structure configured to execute executable programming Examples of the processing circuit 1410 may include a general purpose processor, a digital signal processor (DSP), an application-specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1410 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1410 are for illustration and other suitable configurations within the scope of the disclosure are also contemplated.

According to one or more aspects of the disclosure, the processing circuit 1410 may be adapted to perform any or all of the features, processes, functions, operations and/or routines for any or all of the apparatuses described herein. For example, the processing circuit 1410 may be configured to perform any of the steps, functions, and/or processes described with respect to FIGS. 1-13 and 15-18. As used herein, the term "adapted" in relation to the processing circuit 1410 may refer to the processing circuit 1410 being one or more of configured, used, implemented, and/or programmed to perform a particular process, function, operation and/or routine according to various features described herein.

The processing circuit 1410 may be a specialized processor, such as an application-specific integrated circuit (ASIC) that serves as a means for (e.g., structure for) carrying out any one of the operations described in conjunction with FIGS. 1-13 and 15-18. The processing circuit 1410 serves as one example of a means for transmitting and/or a means for receiving. In various implementations, the processing circuit 1410 may incorporate the functionality of the first apparatus 202 (e.g., the numerology controller 216) or the second apparatus 204 (e.g., the numerology controller 220) of FIG. 2.

According to at least one example of the apparatus 1400, the processing circuit 1410 may include one or more of a circuit/module for determining a transmission property 1420, a circuit/module for communicating 1422, a circuit/module for determining whether transmission properties are different 1424, a circuit/module for invoking a determination 1426, a circuit/module for determining whether a guard band is used between tones 1428, a circuit/module for determining whether to send 1440, a circuit/module for detecting 1442, or a circuit/module for determining based on detected information 1444. In various implementations, the circuit/module for determining a transmission property 1420, the circuit/module for communicating 1422, the circuit/module for determining whether transmission properties are different 1424, the circuit/module for invoking a determination 1426, the circuit/module for determining whether a guard band is used between tones 1428, the circuit/module for determining whether to send 1440, the circuit/module for detecting 1442, or the circuit/module for determining based on detected information 1444 may provide and/or incorporate the functionality of the first apparatus 202 (e.g., the numerology controller 216) or the second apparatus 204 (e.g., the numerology controller 220) of FIG. 2.

As mentioned above, programming stored by the storage medium 1404, when executed by the processing circuit 1410, causes the processing circuit 1410 to perform one or more of the various functions and/or process operations described herein. For example, the programming may cause the processing circuit 1410 to perform the various functions, steps, and/or processes described herein with respect to FIGS. 1-13 and 15-18 in various implementations. As shown in FIG. 14, the storage medium 1404 may include one or more of code for determining a transmission property 1430, code for communicating 1432, code for determining whether transmission properties are different 1434, code for invoking a determination 1436, code for determining whether a guard band is used between tones 1438, code for determining whether to send 1450, code for detecting 1452, or code for determining based on detected information 1454. In various implementations, the code for determining a transmission property 1430, the code for communicating 1432, the code for determining whether transmission properties are different 1434, the code for invoking a determination 1436, the code for determining whether a guard band is used between tones 1438, the code for determining whether to send 1450, the code for detecting 1452, or the code for determining based on detected information 1454 may be executed or otherwise used to provide the functionality described herein for the circuit/module for determining a transmission property 1420, the circuit/module for communicating 1422, the circuit/module for determining whether transmission properties are different 1424, the circuit/module for invoking a determination 1426, the circuit/module for determining whether a guard band is used between tones 1428, the circuit/module for determining whether to send 1440, the circuit/module for detecting 1442, or the circuit/module for determining based on detected information 1444.

The circuit/module for determining a transmission property 1420 may include circuitry and/or programming (e.g., code for determining a transmission property 1430 stored on the storage medium 1404) adapted to perform several functions relating to, for example, determining a transmission property to be used (or being used) for communication via a resource (e.g., a set of tones). In some aspects, the circuit/module for determining a transmission property 1420 (e.g., a means for determining a transmission property) may correspond to, for example, a processing circuit.

In some scenarios, the circuit/module for determining a transmission property 1420 identifies a transmission property that was previously specified (e.g., by a scheduling entity, a TRP, or some other entity). For example, the circuit/module for determining a transmission property 1420 may obtain transmission property information from the communication interface 1402, the circuit/module for communicating 1422, the memory device 1408, or some other component of the apparatus 1400. The circuit/module for determining a transmission property 1420 may then provide an indication of the transmission property to the circuit/module for communicating 1422, the memory device 1408, or some other component of the apparatus 1400.

In some scenarios, the circuit/module for determining a transmission property 1420 selects a transmission property to be used. For example, the circuit/module for determining a transmission property 1420 may identify a type of traffic to be carried over a medium and then determine what CP length, tone spacing, etc., should be used for that traffic (e.g., based on a mapping or other selection criteria). As another example, the circuit/module for determining a transmission property 1420 may select a transmission property to be used (e.g., for a guard band) based on whether the transmission properties for adjoining bands are different (and, if so, by what factor). In either case, the circuit/module for determining a transmission property 1420 may provide an indication of the selected transmission property to the circuit/module for communicating 1422, the memory device 1408, or some other component of the apparatus 1400.

The circuit/module for communicating 1422 may include circuitry and/or programming (e.g., code for communicating 1432 stored on the storage medium 1404) adapted to perform several functions relating to, for example, communicating information. In some implementations, the communication involves receiving the information. In some implementations, the communication involves sending (e.g., transmitting) the information. In some implementations, the communication involves communicating via tones or other resources (e.g., modulating signals onto the resources).

The information may take different forms in different scenarios. In some aspects, the circuit/module for communicating 1422 may communicate synchronization signals. In some aspects, the circuit/module for communicating 1422 may communicate synchronization information. In some aspects, the circuit/module for communicating 1422 may communicate data. In some aspects, the circuit/module for communicating 1422 may communicate control information.

In some implementations where the communicating involves receiving information, the circuit/module for communicating 1422 receives information (e.g., from the communication interface 1402, the receiver 1416, the memory device 1408, some other component of the apparatus 1400, or some other device), processes (e.g., decodes) the information, and outputs the information to another component of the apparatus 1400 (e.g., the memory device 1408 or some other component). In some scenarios (e.g., if the circuit/module for communicating 1422 includes a receiver), the communicating involves the circuit/module for communicating 1422 receiving information directly from a device that transmitted the information (e.g., via radio frequency signaling or some other type of signaling suitable for the applicable communication medium).

In some implementations where the communicating involves sending information, the circuit/module for communicating 1422 obtains information (e.g., from the memory device 1408 or some other component of the apparatus 1400), processes (e.g., encodes) the information, and outputs the processed information. In some scenarios, the communicating involves sending the information to another component of the apparatus 1400 (e.g., the transmitter 1414, the communication interface 1402, or some other component) that will transmit the information to another device. In some scenarios (e.g., if the circuit/module for communicating 1422 includes a transmitter), the communicating involves the circuit/module for communicating 1422 transmitting the information directly to another device (e.g., the ultimate destination) via radio frequency signaling or some other type of signaling suitable for the applicable communication medium.

The circuit/module for communicating 1422 (e.g., a means for communicating) may take various forms. In some aspects, the circuit/module for communicating 1422 may correspond to, for example, an interface (e.g., a bus interface, a send/receive interface, or some other type of signal interface), a communication device, a transceiver, a transmitter, a receiver, or some other similar component as discussed herein. In some implementations, the communication interface 1402 includes the circuit/module for communicating 1422 and/or the code for communicating 1432. In some implementations, the circuit/module for communicating 1422 and/or the code for communicating 1432 is configured to control the communication interface 1402 (e.g., a transceiver, a receiver, or a transmitter) to communicate the information.

The circuit/module for determining whether transmission properties are different 1424 may include circuitry and/or programming (e.g., code for determining whether transmission properties are different 1434 stored on the storage medium 1404) adapted to perform several functions relating to, for example, determining whether one transmission property is the same as another transmission property. In some aspects, the circuit/module for determining whether transmission properties are different 1424 (e.g., a means for determining whether transmission properties are different) may correspond to, for example, a processing circuit.

In some aspects, the circuit/module for determining whether transmission properties are different 1424 may compare two or more transmission properties (e.g., designated for different bands). To this end, the circuit/module for determining whether transmission properties are different 1424 may obtain information about each transmission property. For example, the circuit/module for determining 1422 may obtain this information from the circuit/module for communicating 1422, the circuit/module for determining a transmission property 1420, the communication interface 1402, the memory device 1408, or some other component of the apparatus 1400. Next, the circuit/module for determining whether transmission properties are different 1424 compares the obtained information. The circuit/module for determining whether transmission properties are different 1424 then outputs an indication of the comparison to the circuit/module for communicating 1422, the circuit/module for determining a transmission property 1420, the memory device 1408, or some other component of the apparatus 1400.

The circuit/module for invoking a determination 1426 may include circuitry and/or programming (e.g., code for invoking a determination 1436 stored on the storage medium 1404) adapted to perform several functions relating to, for example, triggering a determination of a transmission property. In some aspects, the circuit/module for invoking a determination 1426 (e.g., a means for invoking a determination) may correspond to, for example, a processing circuit.

In some aspects, the circuit/module for invoking a determination 1426 may include functionality similar to the circuit/module for determining whether transmission properties are different 1424. For example, upon determining that certain transmission properties are different from one another, the circuit/module for invoking a determination 1426 may send an indication to the circuit/module for determining a transmission property 1420 to cause the circuit/module for determining a transmission property 1420 to determine another transmission property.

The circuit/module for determining whether a guard band is used between tones 1428 may include circuitry and/or programming (e.g., code for invoking a determining whether a guard band is used between tones 1438 stored on the storage medium 1404) adapted to perform several functions relating to, for example, determining whether to use a guard band. In some aspects, the circuit/module for determining whether a guard band is used between tones 1428 (e.g., a means for determining whether a guard band is used between tones) may correspond to, for example, a processing circuit.

In some aspects, the circuit/module for determining whether a guard band is used between tones 1428 may include functionality similar to the circuit/module for determining whether transmission properties are different 1424. For example, upon determining that certain transmission properties (e.g. for adjacent bands or tones) are different from one another, the circuit/module for determining whether a guard band is used between tones 1428 may send an indication that a guard band is to be used to the circuit/module for communicating 1422, the circuit/module for determining a transmission property 1420, the memory device 1408, or some other component of the apparatus 1400. Conversely, upon determining that certain transmission properties (e.g. for adjacent bands or tones) are the same, the circuit/module for determining whether a guard band is used between tones 1428 may send an indication that a guard band is not needed to the circuit/module for communicating 1422, the circuit/module for determining a transmission property 1420, the memory device 1408, or some other component of the apparatus 1400.

The circuit/module for determining whether to send 1440 may include circuitry and/or programming (e.g., code for determining whether to send 1450 stored on the storage medium 1404) adapted to perform several functions relating to, for example, determining whether to send information. In some aspects, the circuit/module for determining whether to send 1440 (e.g., a means for determining whether to send) may correspond to, for example, a processing circuit.

The information to be sent may take various forms. In some implementations, the information to be sent may include at least one of physical broadcast channel information, secondary synchronization signal information, primary synchronization signal information, or any combination thereof.

In some implementations, the circuit/module for determining whether to send 1440 determines what type of information is to be sent via a guard band. For example, the type and/or amount of information sent via a guard band may be based on the size of the guard band. As another example, the type and/or amount of information sent via a guard band may be based on the amount of synchronization information to be sent.

In some scenarios, the circuit/module for determining whether to send 1440 obtains information that is used to make a send decision (e.g., from the memory device 1408 or some other component). In any event, the circuit/module for determining whether to send 1440 may generate an indication of the above determination and send the indication to the circuit/module for communicating 1422, the memory device 1408, or some other component of the apparatus 1400.

The circuit/module for detecting 1442 may include circuitry and/or programming (e.g., code for detecting 1452 stored on the storage medium 1404) adapted to perform several functions relating to, for example, detecting information. In some aspects, the circuit/module for detecting 1442 (e.g., a means for detecting) may correspond to, for example, a processing circuit.

The information may take various forms. In some implementations, the information may include physical broadcast channel information. In this case, the detection may be based on second synchronization information received via a third set of tones (and, optionally, first synchronization information received via a second set of tones). In some implementations, the information may include secondary synchronization signal information. In this case, the detection may be based on second synchronization information received via a third set of tones (and, optionally, first synchronization information received via a second set of tones). In some implementations, the information may include primary synchronization signal information. In this case, the detection may be based on first synchronization information received via a second set of tones (and, optionally, second synchronization information received via a third set of tones).

In some scenarios, the circuit/module for detecting 1442 may initially obtain information that is used for the detection (e.g., from circuit/module for communicating 1422, the communication interface 1402, the memory device 1408 or some other component). The circuit/module for detecting 1442 may then process this information to extract the target information (e.g., based on a set of defined hypotheses). In any event, the circuit/module for detecting 1442 may output the detected information to the circuit/module for determining based on detected information 1444, the memory device 1408, or some other component of the apparatus 1400.

The circuit/module for determining based on detected information 1444 may include circuitry and/or programming (e.g., code for determining based on detected information 1454 stored on the storage medium 1404) adapted to perform several functions relating to, for example, obtaining information. In some aspects, the circuit/module for determining based on detected information 1444 (e.g., a means for determining based on detected information) may correspond to, for example, a processing circuit.

The determined information may take various forms. In some implementations, the information may include broadcast information. In this case, the determination may be based on detected physical broadcast channel information. In some implementations, the information may include at least one of: a physical cell identifier, frame timing, or a combination thereof. In this case, the determination may be based on detected secondary synchronization signal information. In some implementations, the information may include primary synchronization signal information. In this case, the determination may be based on detected primary synchronization signal information.

The circuit/module for determining based on detected information 1444 processes the above detected information to obtain the desired information. For example, broadcast information may be extracted from a broadcast channel. As another example, timing information or a frequency offset estimate may be derived from received synchronization signals. As yet another example, a physical cell identifier may be determined from coding of received synchronization signals. In any event, the circuit/module for determining based on detected information 1444 may output the determined information to the memory device 1408 or some other component of the apparatus 1400.

Example Processes

Figure 15:
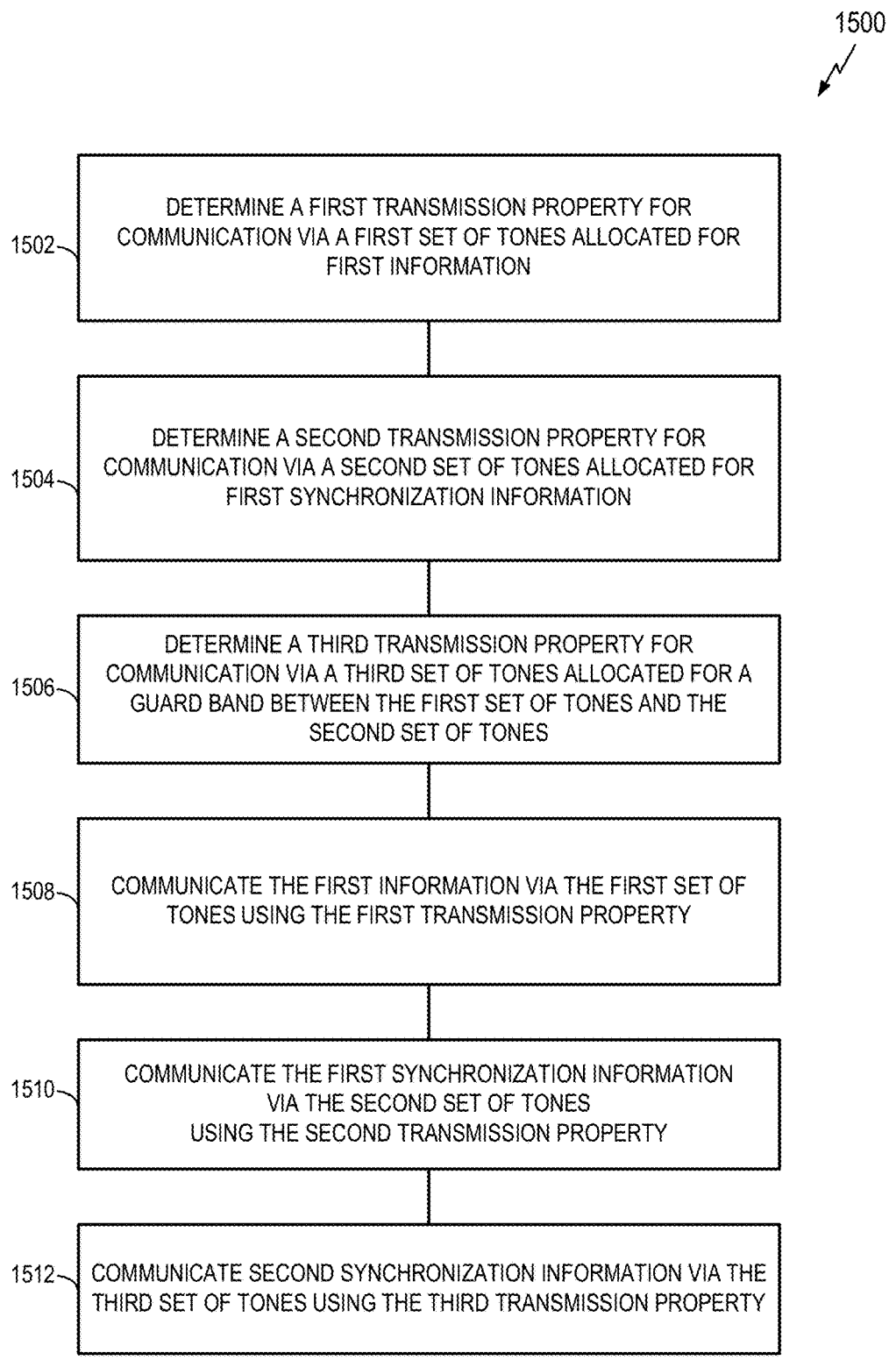
FIG. 15 is a flowchart illustrating an example communication process in accordance with some aspects of the disclosure.

FIG. 15 illustrates a process 1500 for communication in accordance with some aspects of the disclosure. The process 1500 may take place within a processing circuit (e.g., the processing circuit 1410 of FIG. 14), which may be located in a UE, a gNB, an access terminal, a TRP, a base station, or some other suitable apparatus. Of course, in various aspects within the scope of the disclosure, the process 1500 may be implemented by any suitable apparatus capable of supporting communication-related operations.

At block 1502, an apparatus (e.g., a UE or a TRP) determines a first transmission property for communication via a first set of tones allocated for first information.

The first information may take different forms in different scenarios. In some aspects, the first information may include data. In some aspects, the first information may include control information.

The determination of a transmission property may take different forms in different scenarios. In some cases, the apparatus may be configured to use a particular transmission property (e.g., for communicating a particular type of data). In some cases, the apparatus may select the transmission property. In some cases, the apparatus may receive an indication of the transmission property. In some cases, the apparatus may obtain an indication of the transmission property (e.g., from a memory).

In some implementations, the circuit/module for determining a transmission property 1420 of FIG. 14 performs the operations of block 1502. In some implementations, the code for determining a transmission property 1430 of FIG. 14 is executed to perform the operations of block 1502.

At block 1504, the apparatus determines a second transmission property for communication via a second set of tones allocated for first synchronization information. The determination of the second transmission property may take different forms in different scenarios (e.g., as discussed herein).

In some implementations, the circuit/module for determining a transmission property 1420 of FIG. 14 performs the operations of block 1504. In some implementations, the code for determining a transmission property 1430 of FIG. 14 is executed to perform the operations of block 1504.

At block 1506, the apparatus determines a third transmission property for communication via a third set of tones allocated for a guard band between the first set of tones and the second set of tones. The determination of the third transmission property may take different forms in different scenarios (e.g., as discussed herein).

In some implementations, the circuit/module for determining a transmission property 1420 of FIG. 14 performs the operations of block 1506. In some implementations, the code for determining a transmission property 1430 of FIG. 14 is executed to perform the operations of block 1506.

The transmission properties may take different forms in different scenarios. In some aspects, the first transmission property may be different from the second transmission property; and the third transmission property may equal the first transmission property. In some aspects, the first transmission property may be different from the second transmission property; and the third transmission property may equal the second transmission property. In some aspects, the second transmission property may equal the first transmission property; and the third transmission property may equal the second transmission property.

In some scenarios, the first transmission property, the second transmission property, and the third transmission property may include at least one tone spacing. In some aspects, the first transmission property may include a first tone spacing, and the second transmission property may include a second tone spacing that is N times the first tone spacing; where N is greater than or equal to 2. In some aspects, the first transmission property may include a first tone spacing, and the second transmission property may include a second tone spacing; where the first tone spacing is N times the second tone spacing, and N is greater than or equal to 2.

In some scenarios, the first transmission property, the second transmission property, and the third transmission property may include at least one cyclic prefix (CP) duration. In some aspects, the first transmission property may include a first cyclic prefix (CP) duration, and the second transmission property may include a second cyclic prefix (CP) duration that is N times the first cyclic prefix (CP) duration; where N is greater than or equal to 2. In some aspects, the first transmission property may include a first cyclic prefix (CP) duration, and the second transmission property may include a second cyclic prefix (CP) duration; where the first cyclic prefix (CP) duration is N times the second cyclic prefix (CP) duration, and N is greater than or equal to 2.

At block 1508, the apparatus communicates the first information via the first set of tones using the first transmission property. The communication of the information may take different forms in different scenarios.

In some cases, the apparatus (e.g., a TRP) sends (e.g., transmits) the information. For example, the communication of the first information may include sending the first information via the first set of tones.

In some cases, the apparatus (e.g., a UE) receives the information. For example, the communication of the first information may include receiving the first information via the first set of tones.

In some implementations, the circuit/module for communicating 1422 of FIG. 14 performs the operations of block 1508. In some implementations, the code for communicating 1432 of FIG. 14 is executed to perform the operations of block 1508.

At block 1510, the apparatus communicates the first synchronization information via the second set of tones using the second transmission property. The communication of the first synchronization information may take different forms in different scenarios (e.g., as discussed herein). For example, the communication of the first synchronization information may include sending the first synchronization information (e.g., by a TRP) via the second set of tones. As another example, the communication of the first synchronization information may include receiving the first synchronization information (e.g. by a UE) via the second set of tones.

In some implementations, the circuit/module for communicating 1422 of FIG. 14 performs the operations of block 1510. In some implementations, the code for communicating 1432 of FIG. 14 is executed to perform the operations of block 1510.

At block 1512, the apparatus communicates second synchronization information via the third set of tones using the third transmission property. In some aspects, the second synchronization information may be communicated every Nth tone of the third set of tones, where N is greater than or equal to 2.

The communication of the second synchronization information may take different forms in different scenarios (e.g., as discussed herein). For example, the communication of the second synchronization information may include sending the second synchronization information (e.g., by a TRP) via the third set of tones. As another example, the communication of the second synchronization information may include receiving the second synchronization information (e.g. by a UE) via the third set of tones.

In some implementations, the circuit/module for communicating 1422 of FIG. 14 performs the operations of block 1512. In some implementations, the code for communicating 1432 of FIG. 14 is executed to perform the operations of block 1512.

The second synchronization information may take different forms in different scenarios. In some aspects, the second synchronization information may include at least one primary synchronization signal (PSS). In some aspects, the second synchronization information may include at least one secondary synchronization signal (SSS). In some aspects, the second synchronization information may include at least one short secondary synchronization signal (SSS) sequence 1. In some aspects, the second synchronization information may include at least one short secondary synchronization signal (SSS) sequence 2. In some aspects, the second synchronization information may include physical broadcast channel (PBCH) information.

In some aspects, a process may include one or more of any of the operations discussed above in conjunction with FIG. 15.

Figure 16:
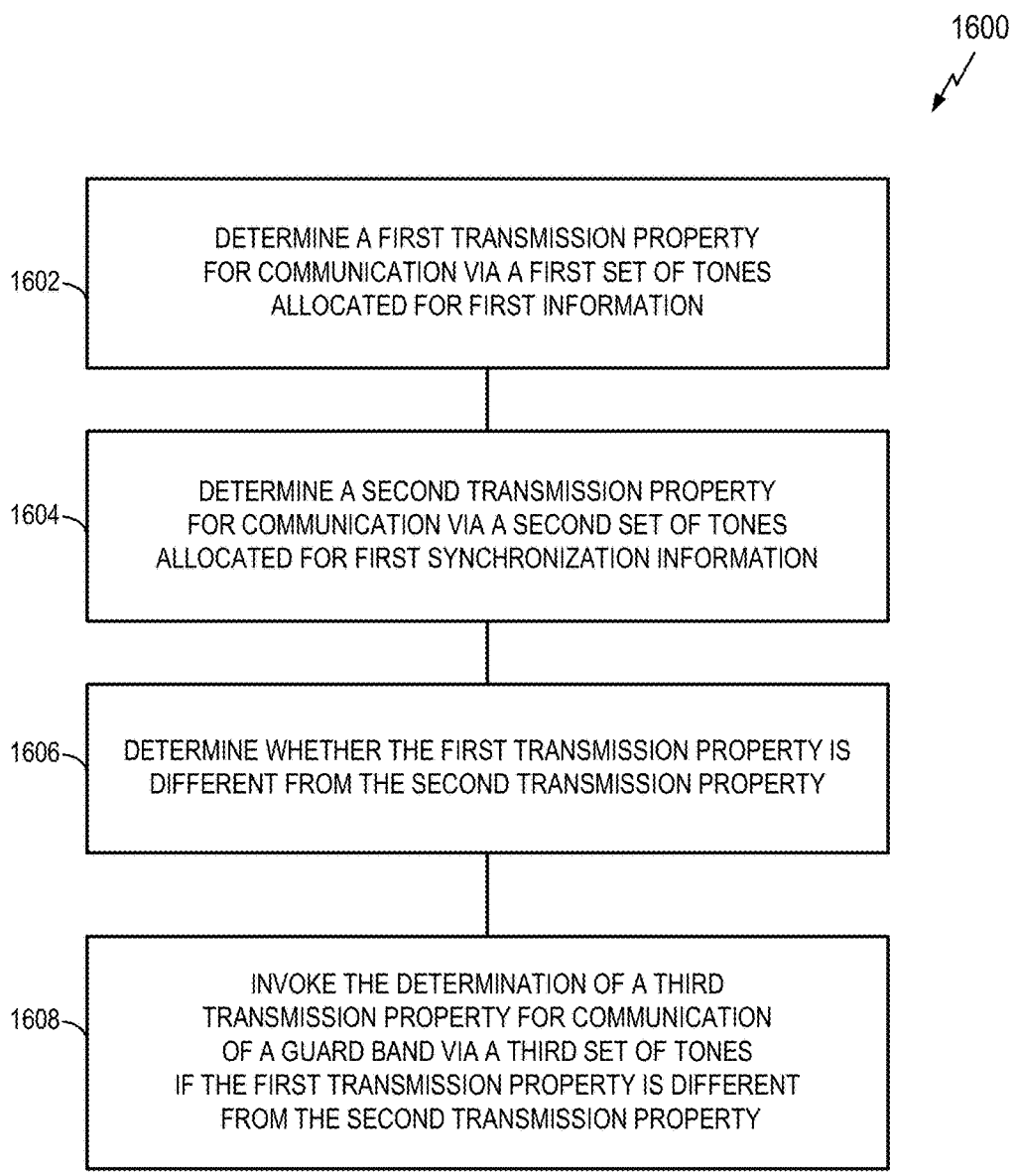
FIG. 16 is a flowchart illustrating an example process for dynamically using a guard band with synchronization information in accordance with some aspects of the disclosure.

FIG. 16 illustrates a process 1600 for communication in accordance with some aspects of the disclosure. One or more aspects of the process 1600 may be used in conjunction with (e.g., in addition to or as part of) the process 1500 of FIG. 15. The process 1600 may take place within a processing circuit (e.g., the processing circuit 1410 of FIG. 14), which may be located in a UE, a gNB, an access terminal, a TRP, a base station, or some other suitable apparatus. Of course, in various aspects within the scope of the disclosure, the process 1600 may be implemented by any suitable apparatus capable of supporting communication-related operations.

At block 1602, an apparatus (e.g., a UE or a TRP) determines a first transmission property for communication via a first set of tones allocated for first information. For example, the apparatus may select or obtain an indication of a tone spacing or a CP duration to be used for communicating the first information.

In some implementations, the circuit/module for determining a transmission property 1420 of FIG. 14 performs the operations of block 1602. In some implementations, the code for determining a transmission property 1430 of FIG. 14 is executed to perform the operations of block 1602.

At block 1604, the apparatus determines a second transmission property for communication via a second set of tones allocated for first synchronization information. For example, the apparatus may select or obtain an indication of a tone spacing or a CP duration to be used for communicating the first synchronization information.

In some implementations, the circuit/module for determining a transmission property 1420 of FIG. 14 performs the operations of block 1604. In some implementations, the code for determining a transmission property 1430 of FIG. 14 is executed to perform the operations of block 1604.

At block 1606, the apparatus determines whether the first transmission property is different from the second transmission property.

In some implementations, the circuit/module for determining whether transmission properties are different 1424 of FIG. 14 performs the operations of block 1606. In some implementations, the code for determining whether transmission properties are different 1434 of FIG. 14 is executed to perform the operations of block 1606.

At block 1608, the apparatus invokes the determination of a third transmission property for communication of a guard band via a third set of tones if the first transmission property is different from the second transmission property. For example, the apparatus may select or obtain an indication of a tone spacing or a CP duration to be used for communicating information via the guard band.

In some implementations, the circuit/module for invoking a determination 1426 of FIG. 14 performs the operations of block 1608. In some implementations, the code for invoking a determination 1436 of FIG. 14 is executed to perform the operations of block 1608.

In some aspects, a process may include one or more of any of the operations discussed above in conjunction with FIG. 16.

Figure 17:
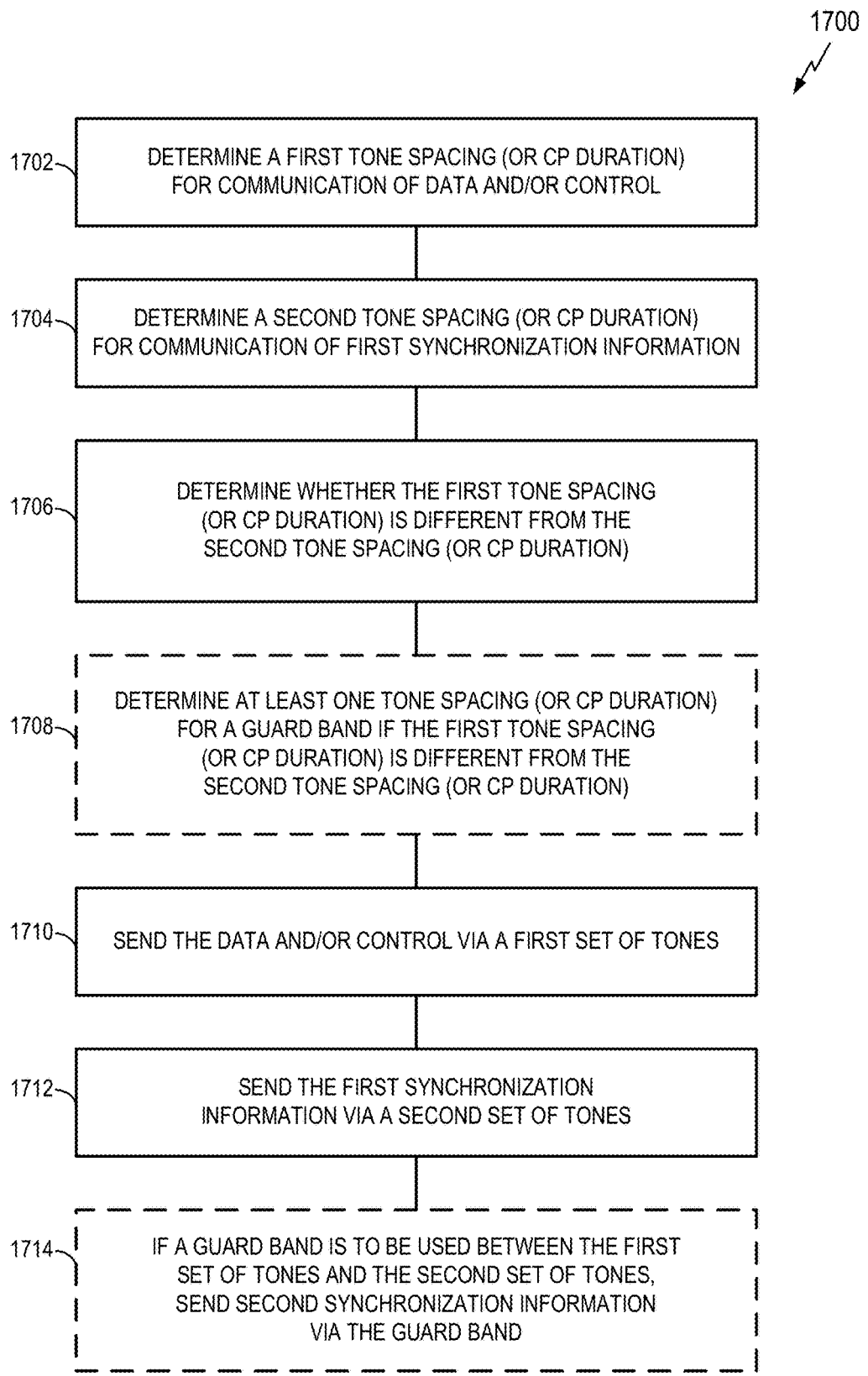
FIG. 17 is a flowchart illustrating an example transmit-side process in accordance with some aspects of the disclosure.

FIG. 17 illustrates a process 1700 for communication in accordance with some aspects of the disclosure. One or more aspects of the process 1700 may be used in conjunction with (e.g., in addition to or as part of) the process 1500 of FIG. 15. In some aspects, the process 1700 may be performed by an apparatus that is sending data and/or control to another apparatus (e.g., the apparatus discussed in FIG. 18). The process 1700 may take place within a processing circuit (e.g., the processing circuit 1410 of FIG. 14), which may be located in a UE, a gNB, an access terminal, a TRP, a base station, or some other suitable apparatus. Of course, in various aspects within the scope of the disclosure, the process 1700 may be implemented by any suitable apparatus capable of supporting communication-related operations.

At block 1702, an apparatus (e.g., a UE or a TRP) determines a first tone spacing (or CP duration) for communication of data and/or control. For example, the apparatus may select or be assigned the first tone spacing (or CP duration) based on at least one of: the type of traffic to be communicated, at least one other criterion, or a combination thereof.

In some implementations, the circuit/module for determining a transmission property 1420 of FIG. 14 performs the operations of block 1702. In some implementations, the code for determining a transmission property 1430 of FIG. 14 is executed to perform the operations of block 1702.

At block 1704, the apparatus determines a second tone spacing (or CP duration) for communication of first synchronization information. For example, the apparatus may select or be assigned the second tone spacing (or CP duration) based on at least one of: the first synchronization information to be communicated, at least one other criterion, or a combination thereof.

In some implementations, the circuit/module for determining a transmission property 1420 of FIG. 14 performs the operations of block 1704. In some implementations, the code for determining a transmission property 1430 of FIG. 14 is executed to perform the operations of block 1704.

At block 1706, the apparatus determines whether the first tone spacing (or CP duration) is different from the second tone spacing (or CP duration).

In some implementations, the circuit/module for determining whether transmission properties are different 1424 of FIG. 14 performs the operations of block 1706. In some implementations, the code for determining whether transmission properties are different 1434 of FIG. 14 is executed to perform the operations of block 1706.

At optional block 1708, if the first tone spacing (or CP duration) is different from the second tone spacing (or CP duration), the apparatus determines a tone spacing (or CP duration) for a guard band. For example, the apparatus may select a tone spacing (or CP duration) for the guard band that matches the first tone spacing (or CP duration) or the second tone spacing (or CP duration).

In some implementations, the circuit/module for determining a transmission property 1420 of FIG. 14 performs the operations of block 1708. In some implementations, the code for determining a transmission property 1430 of FIG. 14 is executed to perform the operations of block 1708.

At block 1710, the apparatus sends the data and/or control via a first set of tones. For example, the apparatus may transmit the data and/or control via a data and/or control band.

In some implementations, the circuit/module for communicating 1422 of FIG. 14 performs the operations of block 1710. In some implementations, the code for communicating 1432 of FIG. 14 is executed to perform the operations of block 1710.

At block 1712, the apparatus sends the first synchronization information via a second set of tones. For example, the apparatus may transmit the first synchronization information via a synchronization band.

In some implementations, the circuit/module for communicating 1422 of FIG. 14 performs the operations of block 1712. In some implementations, the code for communicating 1432 of FIG. 14 is executed to perform the operations of block 1712.

At optional block 1714, if a guard band is to be used between the first set of tones and the second set of tones, the apparatus sends second synchronization information via the guard band. For example, the apparatus may transmit the second synchronization information via the third set of tones of FIG. 15.

In some implementations, the circuit/module for communicating 1422 of FIG. 14 performs the operations of block 1714. In some implementations, the code for communicating 1432 of FIG. 14 is executed to perform the operations of block 1714.

In some aspects, a process may include any combination of the operations discussed above in conjunction with FIG. 17.

Figure 18:
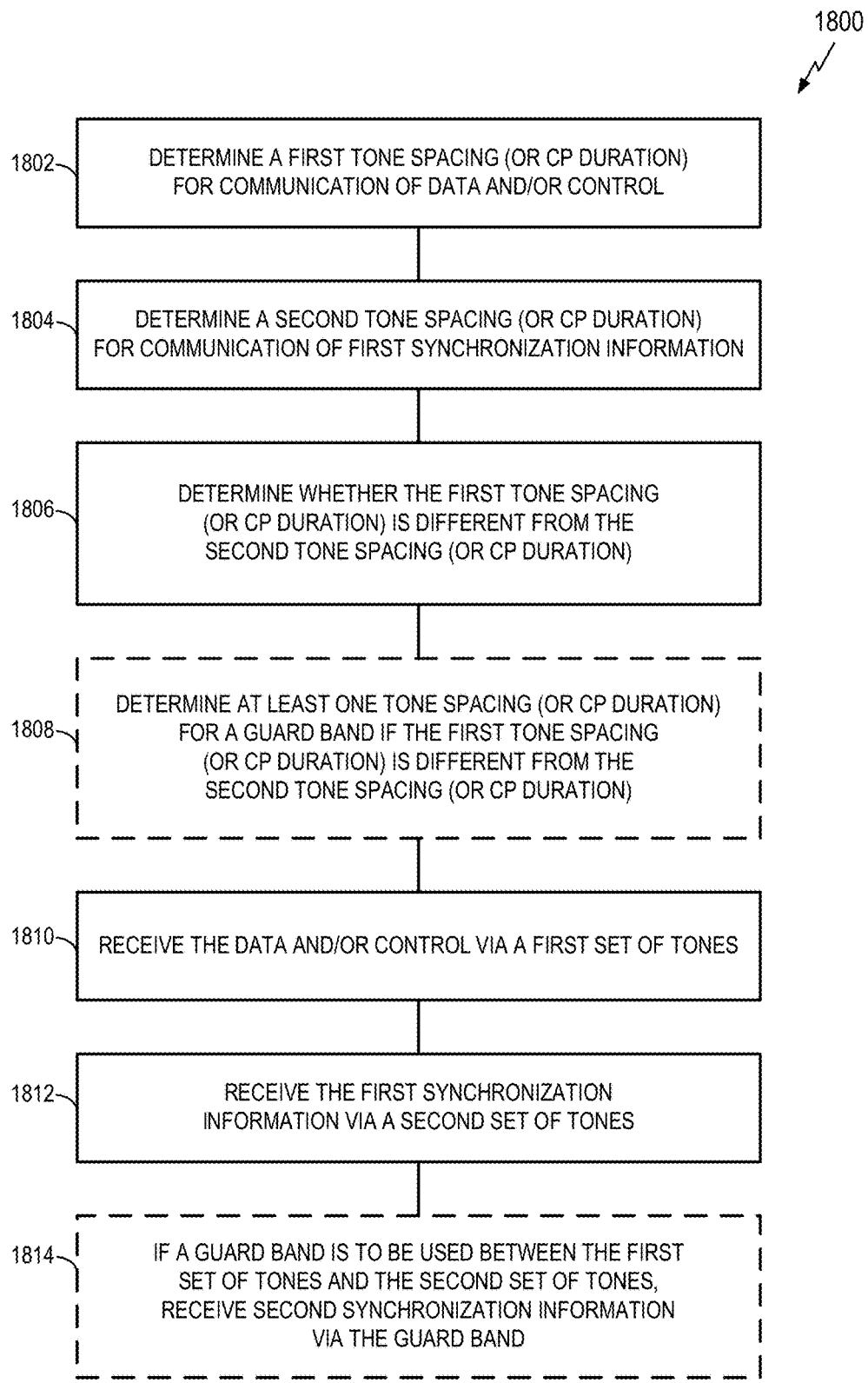
FIG. 18 is a flowchart illustrating an example receive-side process in accordance with some aspects of the disclosure.

FIG. 18 illustrates a process 1800 for communication in accordance with some aspects of the disclosure. One or more aspects of the process 1800 may be used in conjunction with (e.g., in addition to or as part of) the process 1500 of FIG. 15. In some aspects, the process 1800 may be performed by an apparatus that is receiving data and/or control from another apparatus (e.g., the apparatus discussed in FIG. 17). The process 1800 may take place within a processing circuit (e.g., the processing circuit 1410 of FIG. 14), which may be located in a UE, a gNB, an access terminal, a TRP, a base station, or some other suitable apparatus. Of course, in various aspects within the scope of the disclosure, the process 1800 may be implemented by any suitable apparatus capable of supporting communication-related operations.

At block 1802, an apparatus (e.g., a UE or a TRP) determines a first tone spacing (or CP duration) for communication of data and/or control. For example, the apparatus may receive an indication of (or otherwise be assigned) the first tone spacing (or CP duration) to be used for the communication of the data and/or control (e.g., for a particular transmission period or traffic flow).

In some implementations, the circuit/module for determining a transmission property 1420 of FIG. 14 performs the operations of block 1802. In some implementations, the code for determining a transmission property 1430 of FIG. 14 is executed to perform the operations of block 1802.

At block 1804, the apparatus determines a second tone spacing (or CP duration) for communication of first synchronization information. For example, the apparatus may receive an indication of (or otherwise be assigned) the second tone spacing (or CP duration) to be used for the communication of the first synchronization information (e.g., for a particular transmission period or traffic flow).

In some implementations, the circuit/module for determining a transmission property 1420 of FIG. 14 performs the operations of block 1804. In some implementations, the code for determining a transmission property 1430 of FIG. 14 is executed to perform the operations of block 1804.

At block 1806, the apparatus determines whether the first tone spacing (or CP duration) is different from the second tone spacing (or CP duration).

In some implementations, the circuit/module for determining whether transmission properties are different 1424 of FIG. 14 performs the operations of block 1806. In some implementations, the code for determining whether transmission properties are different 1434 of FIG. 14 is executed to perform the operations of block 1806.

At block 1808, if the first tone spacing (or CP duration) is different from the second tone spacing (or CP duration), the apparatus determines a tone spacing (or CP duration) for a guard band. For example, the apparatus may receive an indication of (or otherwise be assigned) a tone spacing (or CP duration) to be used for communication via the guard band (e.g., for a particular transmission period or traffic flow).

In some implementations, the circuit/module for determining a transmission property 1420 of FIG. 14 performs the operations of block 1808. In some implementations, the code for determining a transmission property 1430 of FIG. 14 is executed to perform the operations of block 1808.

At block 1810, the apparatus receives the data and/or control via a first set of tones. For example, the apparatus may receive the data and/or control via a data and/or control band.

In some implementations, the circuit/module for communicating 1422 of FIG. 14 performs the operations of block 1810. In some implementations, the code for communicating 1432 of FIG. 14 is executed to perform the operations of block 1810.

At block 1812, the apparatus receives the first synchronization information via a second set of tones. For example, the apparatus may receive the first synchronization information via a synchronization band.

In some implementations, the circuit/module for communicating 1422 of FIG. 14 performs the operations of block 1812. In some implementations, the code for communicating 1432 of FIG. 14 is executed to perform the operations of block 1812.

At block 1814, if a guard band is to be used between the first set of tones and the second set of tones, the apparatus receives second synchronization information via the guard band. For example, the apparatus may receive the second synchronization information via the third set of tones of FIG. 15.

In some implementations, the circuit/module for communicating 1422 of FIG. 14 performs the operations of block 1814. In some implementations, the code for communicating 1432 of FIG. 14 is executed to perform the operations of block 1814.

In some aspects, a process may include any combination of the operations discussed above in conjunction with FIG. 18.

Figure 19:
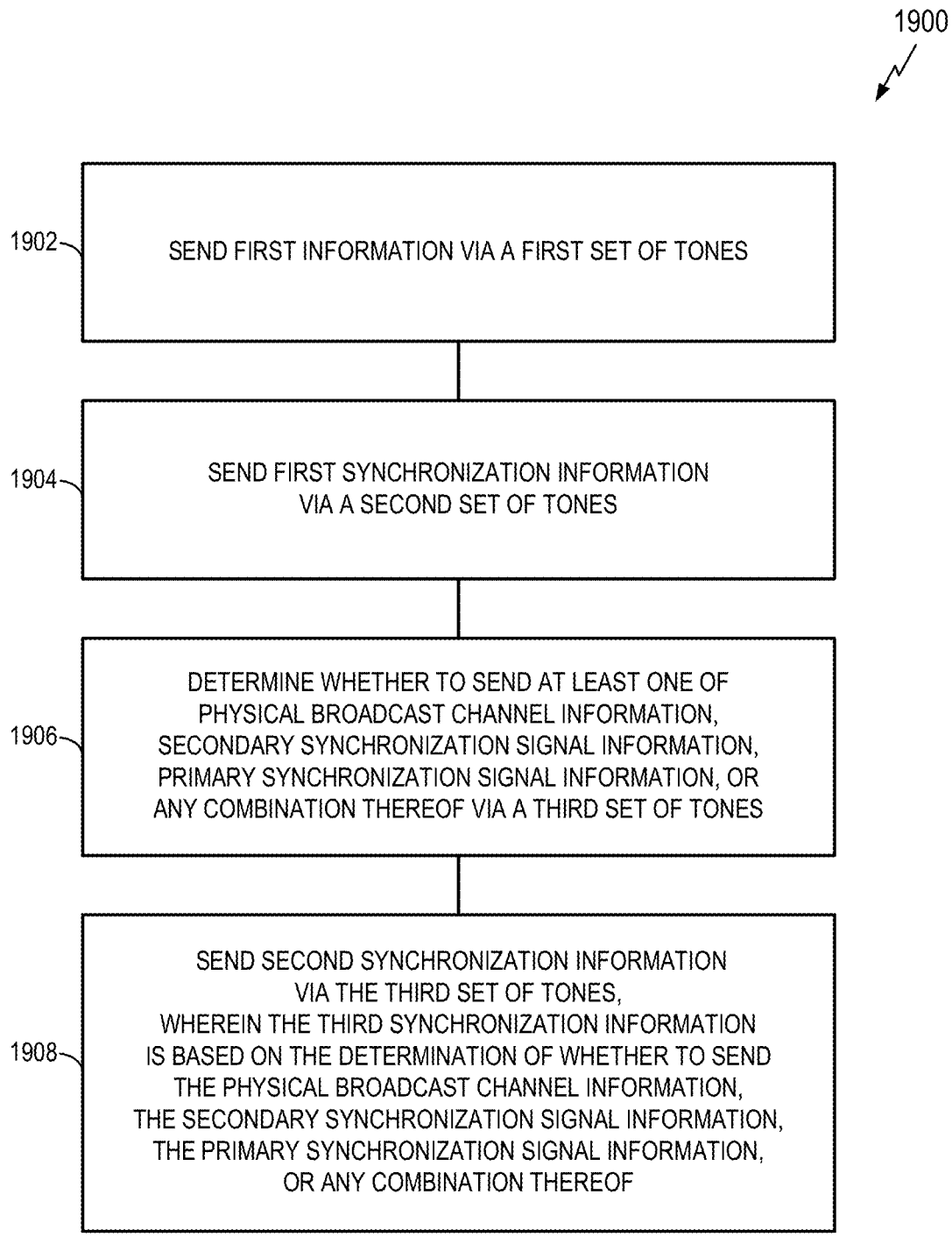
FIG. 19 is a flowchart illustrating another example transmit-side process in accordance with some aspects of the disclosure.

FIG. 19 illustrates a process 1900 for communication in accordance with some aspects of the disclosure. One or more aspects of the process 1900 may be used in conjunction with (e.g., in addition to or as part of) the process 1500 of FIG. 15. In some aspects, the process 1900 may be performed by an apparatus that is sending data and/or control to another apparatus (e.g., an apparatus as discussed in FIG. 20, 21, or 22). The process 1900 may take place within a processing circuit (e.g., the processing circuit 1410 of FIG. 14), which may be located in a UE, a gNB, an access terminal, a TRP, a base station, or some other suitable apparatus. Of course, in various aspects within the scope of the disclosure, the process 1900 may be implemented by any suitable apparatus capable of supporting communication-related operations.

At block 1902, an apparatus (e.g., a UE or a TRP) sends first information via a first set of tones.

In some implementations, the circuit/module for communicating 1422 of FIG. 14 performs the operations of block 1902. In some implementations, the code for communicating 1432 of FIG. 14 is executed to perform the operations of block 1902.

At block 1904, the apparatus sends first synchronization information via a second set of tones.

In some implementations, the circuit/module for communicating 1422 of FIG. 14 performs the operations of block 1904. In some implementations, the code for communicating 1432 of FIG. 14 is executed to perform the operations of block 1904.

At block 1906, the apparatus determines whether to send at least one of physical broadcast channel information, secondary synchronization signal information, primary synchronization signal information, or any combination thereof via the third set of tones.

In some implementations, the circuit/module for determining whether to send 1440 of FIG. 14 performs the operations of block 1906. In some implementations, the code for determining whether to send 1450 of FIG. 14 is executed to perform the operations of block 1906.

At block 1908, the apparatus sends second synchronization information via the third set of tones. In some aspects, the second synchronization information may be based on the determination of whether to send the physical broadcast channel information, the secondary synchronization signal information, the primary synchronization signal information, or any combination thereof.

In some implementations, the circuit/module for communicating 1422 of FIG. 14 performs the operations of block 1908. In some implementations, the code for communicating 1432 of FIG. 14 is executed to perform the operations of block 1908.

In some aspects, a process may include any combination of the operations discussed above in conjunction with FIG. 19.

Figure 20:
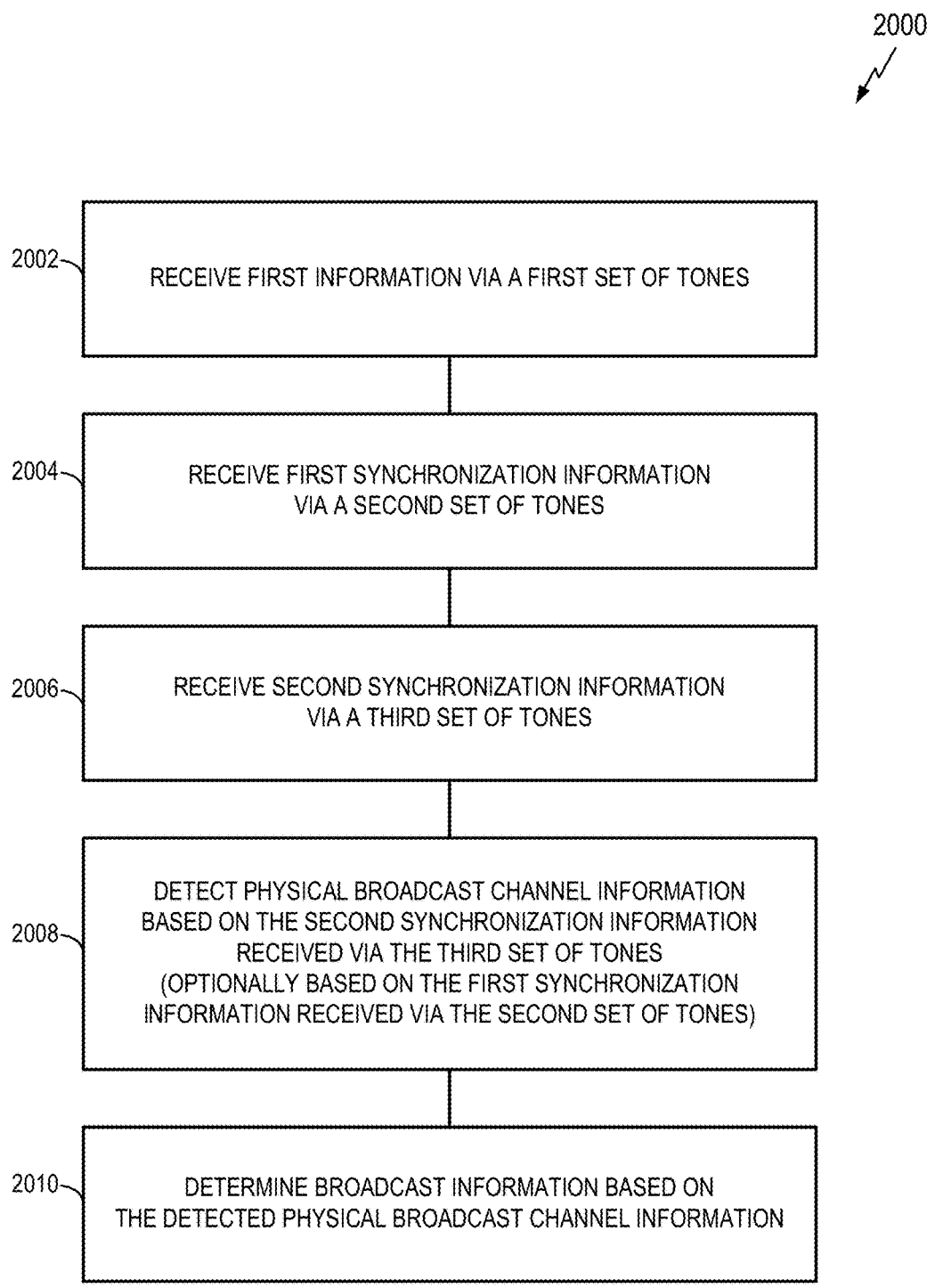
FIG. 20 is a flowchart illustrating another example receive-side process in accordance with some aspects of the disclosure.

FIG. 20 illustrates a process 2000 for communication in accordance with some aspects of the disclosure. One or more aspects of the process 2000 may be used in conjunction with (e.g., in addition to or as part of) the process 1500 of FIG. 15. In some aspects, the process 2000 may be performed by an apparatus that is receiving data and/or control from another apparatus (e.g., the apparatus discussed in FIG. 19). The process 2000 may take place within a processing circuit (e.g., the processing circuit 1410 of FIG. 14), which may be located in a UE, a gNB, an access terminal, a TRP, a base station, or some other suitable apparatus. Of course, in various aspects within the scope of the disclosure, the process 2000 may be implemented by any suitable apparatus capable of supporting communication-related operations.

At block 2002, an apparatus (e.g., a UE or a TRP) receives first information via a first set of tones.

In some implementations, the circuit/module for communicating 1422 of FIG. 14 performs the operations of block 2002. In some implementations, the code for communicating 1432 of FIG. 14 is executed to perform the operations of block 2002.

At block 2004, the apparatus receives first synchronization information via a second set of tones.

In some implementations, the circuit/module for communicating 1422 of FIG. 14 performs the operations of block 2004. In some implementations, the code for communicating 1432 of FIG. 14 is executed to perform the operations of block 2004.

At block 2006, the apparatus receives second synchronization information via a third set of tones.

In some implementations, the circuit/module for communicating 1422 of FIG. 14 performs the operations of block 2006. In some implementations, the code for communicating 1432 of FIG. 14 is executed to perform the operations of block 2006.

At block 2008, the apparatus detects physical broadcast channel information based on the second synchronization information received via the third set of tones. In some aspects, the detection of the physical broadcast channel information may be further based on the first synchronization information received via the second set of tones.

In some implementations, the circuit/module for detecting 1442 of FIG. 14 performs the operations of block 2008. In some implementations, the code for detecting 1452 of FIG. 14 is executed to perform the operations of block 2008.

At block 2010, the apparatus determines broadcast information based on the detected physical broadcast channel information of block 2008.

In some implementations, the circuit/module for determining based on detected information 1444 of FIG. 14 performs the operations of block 2010. In some implementations, the code for determining based on detected information 1454 of FIG. 14 is executed to perform the operations of block 2010.

In some aspects, a process may include any combination of the operations discussed above in conjunction with FIG. 20.

Figure 21:
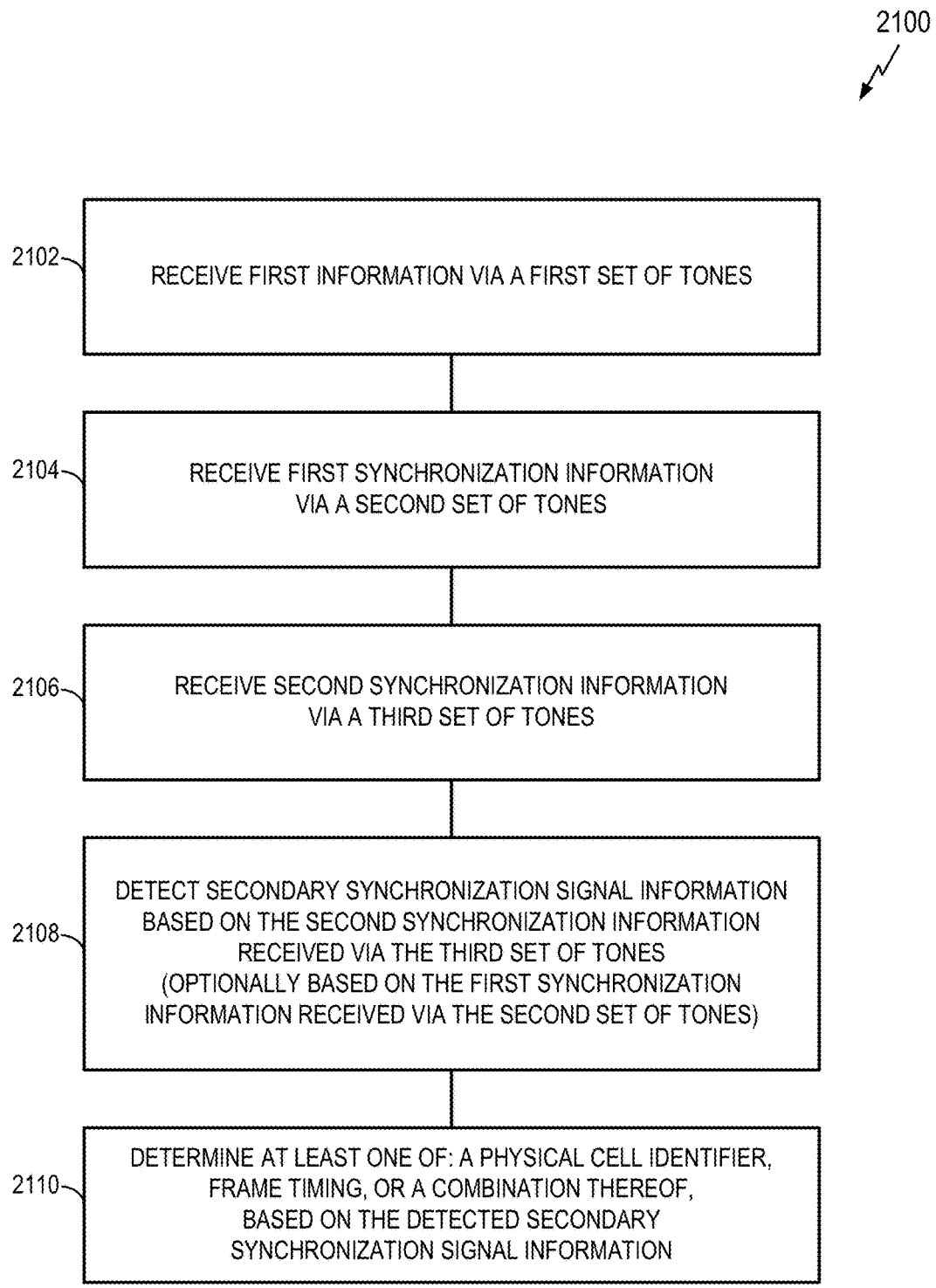
FIG. 21 is a flowchart illustrating another example receive-side process in accordance with some aspects of the disclosure.

FIG. 21 illustrates a process 2100 for communication in accordance with some aspects of the disclosure. One or more aspects of the process 2100 may be used in conjunction with (e.g., in addition to or as part of) the process 1500 of FIG. 15. In some aspects, the process 2100 may be performed by an apparatus that is receiving data and/or control from another apparatus (e.g., the apparatus discussed in FIG. 19). The process 2100 may take place within a processing circuit (e.g., the processing circuit 1410 of FIG. 14), which may be located in a UE, a gNB, an access terminal, a TRP, a base station, or some other suitable apparatus. Of course, in various aspects within the scope of the disclosure, the process 2100 may be implemented by any suitable apparatus capable of supporting communication-related operations.

At block 2102, an apparatus (e.g., a UE or a TRP) receives first information via a first set of tones.

In some implementations, the circuit/module for communicating 1422 of FIG. 14 performs the operations of block 2102. In some implementations, the code for communicating 1432 of FIG. 14 is executed to perform the operations of block 2102.

At block 2104, the apparatus receives first synchronization information via a second set of tones.

In some implementations, the circuit/module for communicating 1422 of FIG. 14 performs the operations of block 2104. In some implementations, the code for communicating 1432 of FIG. 14 is executed to perform the operations of block 2104.

At block 2106, the apparatus receives second synchronization information via a third set of tones.

In some implementations, the circuit/module for communicating 1422 of FIG. 14 performs the operations of block 2106. In some implementations, the code for communicating 1432 of FIG. 14 is executed to perform the operations of block 2106.

At block 2108, the apparatus detects secondary synchronization signal information based on the second synchronization information received via the third set of tones. In some aspects, the detection of the secondary synchronization signal information may be further based on the first synchronization information received via the second set of tones.

In some implementations, the circuit/module for detecting 1442 of FIG. 14 performs the operations of block 2108. In some implementations, the code for detecting 1452 of FIG. 14 is executed to perform the operations of block 2108.

At block 2110, the apparatus determines at least one of: a physical cell identifier, frame timing, or a combination thereof. In some aspects, the determination may be based on the detected secondary synchronization signal information of block 2108.

In some implementations, the circuit/module for determining based on detected information 1444 of FIG. 14 performs the operations of block 2110. In some implementations, the code for determining based on detected information 1454 of FIG. 14 is executed to perform the operations of block 2110.

In some aspects, a process may include any combination of the operations discussed above in conjunction with FIG. 21.

Figure 22:
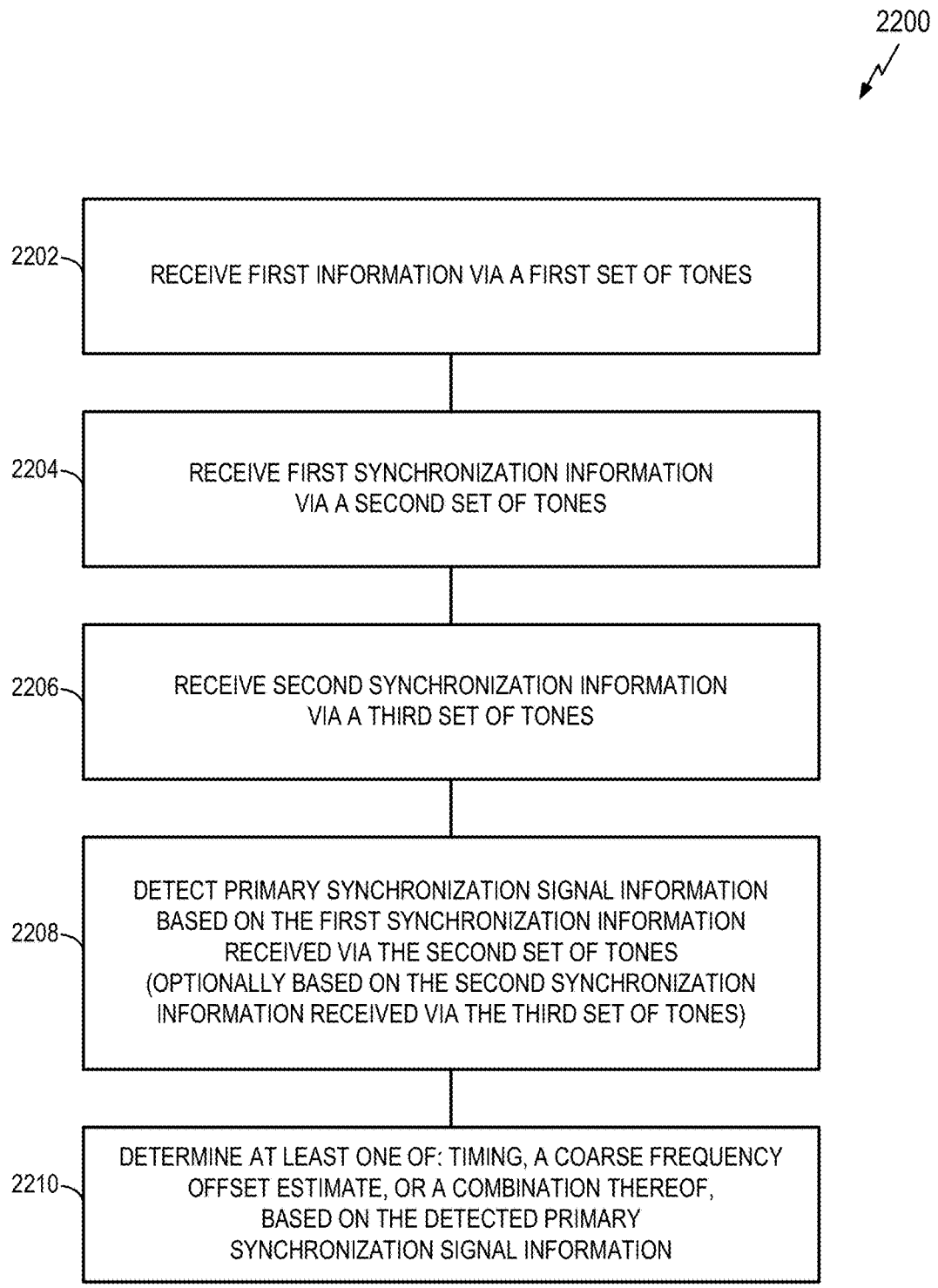
FIG. 22 is a flowchart illustrating another example receive-side process in accordance with some aspects of the disclosure.

FIG. 22 illustrates a process 2200 for communication in accordance with some aspects of the disclosure. One or more aspects of the process 2200 may be used in conjunction with (e.g., in addition to or as part of) the process 1500 of FIG. 15. In some aspects, the process 2200 may be performed by an apparatus that is receiving data and/or control from another apparatus (e.g., the apparatus discussed in FIG. 19). The process 2200 may take place within a processing circuit (e.g., the processing circuit 1410 of FIG. 14), which may be located in a UE, a gNB, an access terminal, a TRP, a base station, or some other suitable apparatus. Of course, in various aspects within the scope of the disclosure, the process 2200 may be implemented by any suitable apparatus capable of supporting communication-related operations.

At block 2202, an apparatus (e.g., a UE or a TRP) receives first information via a first set of tones.

In some implementations, the circuit/module for communicating 1422 of FIG. 14 performs the operations of block 2202. In some implementations, the code for communicating 1432 of FIG. 14 is executed to perform the operations of block 2202.

At block 2204, the apparatus receives first synchronization information via a second set of tones.

In some implementations, the circuit/module for communicating 1422 of FIG. 14 performs the operations of block

2204. In some implementations, the code for communicating 1432 of FIG. 14 is executed to perform the operations of block 2204.

At block 2206, the apparatus receives second synchronization information via a third set of tones.

In some implementations, the circuit/module for communicating 1422 of FIG. 14 performs the operations of block 2206. In some implementations, the code for communicating 1432 of FIG. 14 is executed to perform the operations of block 2206.

At block 2208, the apparatus detects primary synchronization signal information based on the first synchronization information received via the second set of tones. In some aspects, the detection of the primary synchronization signal information may be further based on the second synchronization information received via the third set of tones.

In some implementations, the circuit/module for detecting 1442 of FIG. 14 performs the operations of block 2208. In some implementations, the code for detecting 1452 of FIG. 14 is executed to perform the operations of block 2208.

At block 2210, the apparatus determines timing, a coarse frequency offset estimate, or a combination thereof. In some aspects, the determination may be based on the detected primary synchronization signal information of block 2208.

In some implementations, the circuit/module for determining based on detected information 1444 of FIG. 14 performs the operations of block 2210. In some implementations, the code for determining based on detected information 1454 of FIG. 14 is executed to perform the operations of block 2210.

In some aspects, a process may include any combination of the operations discussed above in conjunction with FIG. 22.

Additional Aspects

The examples set forth herein are provided to illustrate certain concepts of the disclosure. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

As those skilled in the art will readily appreciate, various aspects described throughout this disclosure may be extended to any suitable telecommunication system, network architecture, and communication standard. By way of example, various aspects may be applied to 3GPP 5G systems and/or other suitable systems, including those described by yet-to-be defined wide area network standards. Various aspects may also be applied to systems using LTE (in FDD, TDD, or both modes), LTE-Advanced (LTE-A) (in FDD, TDD, or both modes), Universal Mobile Telecommunications System (UMTS), Global System for Mobile Communications (GSM), Code Division Multiple Access (CDMA), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. Various aspects may also be applied to UMTS systems such as W-CDMA, TD-SCDMA, and TD-CDMA. The actual telecommunication standard, network architecture, and/or communication standard used will depend on the specific application and the overall design constraints imposed on the system. Evolved versions of the LTE network, such as a fifth-generation (5G) network, may provide for many different types of services or applications, including but not limited to web browsing, video streaming, VoIP, mission critical applications, multi-hop networks, remote operations with real-time feedback (e.g., tele-surgery), etc.

Many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application-specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

One or more of the components, steps, features and/or functions illustrated in above may be rearranged and/or combined into a single component, step, feature or function or embodied in several components, steps, or functions. Additional elements, components, steps, and/or functions may also be added without departing from novel features disclosed herein. The apparatus, devices, and/or components illustrated above may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may comprise one or more elements. In addition, terminology of the form "at least one of a, b, or c" or "a, b, c or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. A method of communication for an apparatus, comprising:
   determining a first transmission property for communication with another apparatus via a first set of tones allocated for first information;
   determining a second transmission property for communication with the other apparatus via a second set of tones allocated for first synchronization information, wherein the second transmission property is different from the first transmission property;
   determining a third transmission property for communication with the other apparatus via a third set of tones allocated for a guard band between the first set of tones and the second set of tones;
   communicating the first information via the first set of tones during a time period using the first transmission property;
   communicating the first synchronization information via the second set of tones during the time period using the second transmission property; and
   communicating second synchronization information via the third set of tones during the time period using the third transmission property, wherein the second synchronization information is communicated every Nth tone of the third set of tones and N is greater than or equal to 2.

2. The method of claim 1, wherein the first transmission property, the second transmission property, and the third transmission property comprise at least one tone spacing.

3. The method of claim 1, wherein:
   the first transmission property comprises a first tone spacing;
   the second transmission property comprises a second tone spacing that is N times the first tone spacing; and
   N is greater than or equal to 2.

4. The method of claim 1, wherein:
   the first transmission property comprises a first tone spacing;
   the second transmission property comprises a second tone spacing;
   the first tone spacing is N times the second tone spacing; and
   N is greater than or equal to 2.

5. The method of claim 1, wherein the first transmission property, the second transmission property, and the third transmission property comprise at least one cyclic prefix (CP) duration.

6. The method of claim 1, wherein:
   the first transmission property comprises a first cyclic prefix (CP) duration;

the second transmission property comprises a second cyclic prefix (CP) duration that is N times the first cyclic prefix (CP) duration; and N is greater than or equal to 2.

7. The method of claim 1, wherein:

the first transmission property comprises a first cyclic prefix (CP) duration;

the second transmission property comprises a second cyclic prefix (CP) duration;

the first cyclic prefix (CP) duration is N times the second cyclic prefix (CP) duration; and N is greater than or equal to 2.

8. The method of claim 1, wherein:

the third transmission property equals the second transmission property.

9. The method of claim 1, wherein the first information comprises data, control information, or a combination thereof.

10. The method of claim 1, wherein the second synchronization information comprises at least one primary synchronization signal (PSS).

11. The method of claim 1, wherein the second synchronization information comprises at least one secondary synchronization signal (SSS).

12. The method of claim 1, wherein the second synchronization information comprises at least one short secondary synchronization signal (SSS) sequence 1.

13. The method of claim 1, wherein the second synchronization information comprises at least one short secondary synchronization signal (SSS) sequence 2.

14. The method of claim 1, wherein the second synchronization information comprises physical broadcast channel (PBCH) information.

15. The method of claim 1, further comprising:

determining whether the first transmission property is different from the second transmission property; and invoking the determination of the third transmission property for the communication via the third set of tones if the first transmission property is different from the second transmission property.

16. The method of claim 1, wherein:

the communication of the first information comprises sending the first information via the first set of tones;

the communication of the first synchronization information comprises sending the first synchronization information via the second set of tones; and the communication of the second synchronization information comprises sending the second synchronization information via the third set of tones.

17. The method of claim 16, further comprising:

determining whether to send at least one of physical broadcast channel information, secondary synchronization signal information, primary synchronization signal information, or any combination thereof via the third set of tones, wherein the second synchronization information is based on the determination of whether to send the physical broadcast channel information, the secondary synchronization signal information, the primary synchronization signal information, or any combination thereof.

18. The method of claim 1, wherein:

the communication of the first information comprises receiving the first information via the first set of tones;

the communication of the first synchronization information comprises receiving the first synchronization information via the second set of tones; and the communication of the second synchronization information comprises receiving the second synchronization information via the third set of tones.

19. The method of claim 18, further comprising:

detecting physical broadcast channel information based on the second synchronization information received via the third set of tones; and determining broadcast information based on the detected physical broadcast channel information.

20. The method of claim 19, wherein the detection of the physical broadcast channel information is further based on the first synchronization information received via the second set of tones.

21. The method of claim 18, further comprising:

detecting secondary synchronization signal information based on the second synchronization information received via the third set of tones; and determining, based on the detected secondary synchronization signal information, at least one of: a physical cell identifier, frame timing, or a combination thereof.

22. The method of claim 21, wherein the detection of the secondary synchronization signal information is further based on the first synchronization information received via the second set of tones.

23. The method of claim 18, further comprising:

detecting primary synchronization signal information based on the first synchronization information received via the second set of tones; and determining, based on the detected primary synchronization signal information, at least one of: timing, a coarse frequency offset estimate, or a combination thereof.

24. The method of claim 23, wherein the detection of the primary synchronization signal information is further based on the second synchronization information received via the third set of tones.

25. An apparatus for communication comprising:

a memory; and a processor coupled to the memory, the processor and the memory configured to:

determine a first transmission property for communication with another apparatus via a first set of tones allocated for first information;

determine a second transmission property for communication with the other apparatus via a second set of tones allocated for first synchronization information, wherein the second transmission property is different from the first transmission property;

determine a third transmission property for communication with the other apparatus via a third set of tones allocated for a guard band between the first set of tones and the second set of tones;

communicate the first information via the first set of tones during a time period using the first transmission property;

communicate the first synchronization information via the second set of tones during the time period using the second transmission property; and communicate second synchronization information via the third set of tones during the time period using the third transmission property, wherein the second synchronization information is communicated every Nth tone of the third set of tones and N is greater than or equal to 2.

26. The apparatus of claim 25, wherein the processor and the memory are further configured to:

determine whether the first transmission property is different from the second transmission property; and invoke the determination of the third transmission property for the communication via the third set of tones if the first transmission property is different from the second transmission property.

27. An apparatus for communication comprising:
means for determining transmission properties, wherein the transmission properties comprise a first transmission property for communication with another apparatus via a first set of tones allocated for first information, a second transmission property for communication with the other apparatus via a second set of tones allocated for first synchronization information, wherein the second transmission property is different from the first transmission property, and a third transmission property for communication with the other apparatus via a third set of tones allocated for a guard band between the first set of tones and the second set of tones; and
means for communicating configured to communicate the first information via the first set of tones during a time period using the first transmission property, communicate the first synchronization information via the second set of tones during the time period using the second transmission property, and communicate second synchronization information via the third set of tones during the time period using the third transmission property, wherein the second synchronization information is communicated every Nth tone of the third set of tones and N is greater than or equal to 2.

28. The apparatus of claim 27, further comprising:
means for determining whether the first transmission property is different from the second transmission property; and
means for invoking the determination of the third transmission property for the communication via the third set of tones if the first transmission property is different from the second transmission property.

29. A non-transitory computer-readable medium storing computer-executable code for communication by an apparatus, including code to:
determine a first transmission property for communication with another apparatus via a first set of tones allocated for first information;
determine a second transmission property for communication with the other apparatus via a second set of tones allocated for first synchronization information, wherein the second transmission property is different from the first transmission property;
determine a third transmission property for communication with the other apparatus via a third set of tones allocated for a guard band between the first set of tones and the second set of tones;
communicate the first information via the first set of tones during a time period using the first transmission property;
communicate the first synchronization information via the second set of tones during the time period using the second transmission property; and
communicate second synchronization information via the third set of tones during the time period using the third transmission property, wherein the second synchronization information is communicated every Nth tone of the third set of tones and N is greater than or equal to 2.

* * * * *